United States Patent
Sachs et al.

(10) Patent No.: US 12,542,693 B2
(45) Date of Patent: Feb. 3, 2026

(54) METHOD AND SYSTEM FOR INTERACTION BETWEEN 5G AND MULTIPLE TSC/TSN DOMAINS

(71) Applicant: Telefonaktiebolaget LM Ericsson (PUBL), Stockholm (SE)

(72) Inventors: Joachim Sachs, Sollentuna (SE); Kun Wang, Solna (SE); János Farkas, Kecskemét (HU); Balázs Varga, Budapest (HU); György Miklós, Pilisborosjenő (HU); Kurt Essigmann, Aachen (DE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 252 days.

(21) Appl. No.: 18/001,296

(22) PCT Filed: Jun. 11, 2021

(86) PCT No.: PCT/SE2021/050529
§ 371 (c)(1),
(2) Date: Dec. 9, 2022

(87) PCT Pub. No.: WO2021/251870
PCT Pub. Date: Dec. 16, 2021

(65) Prior Publication Data
US 2023/0239175 A1    Jul. 27, 2023

Related U.S. Application Data

(60) Provisional application No. 63/037,656, filed on Jun. 11, 2020.

(51) Int. Cl.
*H04L 12/46* (2006.01)
*H04J 3/06* (2006.01)
(Continued)

(52) U.S. Cl.
CPC ........ *H04L 12/4625* (2013.01); *H04J 3/0667* (2013.01); *H04L 41/0894* (2022.05);
(Continued)

(58) Field of Classification Search
CPC ... H04L 12/462; H04L 12/4625; H04L 67/00; H04L 67/34; H04L 2012/5618;
(Continued)

(56) References Cited

U.S. PATENT DOCUMENTS

| | | | |
|---|---|---|---|
| 10,979,368 B2 * | 4/2021 | Bonomi | G06F 9/45558 |
| 11,736,359 B2 * | 8/2023 | Jabbar | H04L 41/12 370/254 |

(Continued)

FOREIGN PATENT DOCUMENTS

| | | |
|---|---|---|
| CN | 104052589 A | 9/2014 |
| CN | 109672510 A | 4/2019 |

(Continued)

OTHER PUBLICATIONS

EPO Communication pursuant to Article 94(3) EPC issued for Application No. 21 820 973.2-1216—Nov. 21, 2023.
(Continued)

*Primary Examiner* — Warner Wong
(74) *Attorney, Agent, or Firm* — Baker Botts L.L.P.

(57) ABSTRACT

A method (1200) by a network node (160, 160c) includes determining (1202) a plurality of Time Sensitive Communication, TSC, or Time Sensitive Networking, TSN, domains (12) that exist in a network. The network node instantiates (1204) at least one virtual bridge (14), wherein each virtual bridge serves at least one TSC and/or TSN domain.

21 Claims, 25 Drawing Sheets

(51) Int. Cl.
*H04L 41/0894* (2022.01)
*H04L 41/0895* (2022.01)
*H04L 41/122* (2022.01)
*H04L 67/00* (2022.01)

(52) U.S. Cl.
CPC ........ *H04L 41/0895* (2022.05); *H04L 41/122* (2022.05); *H04L 67/34* (2013.01)

(58) Field of Classification Search
CPC ... H04L 65/00; H04L 65/102; H04L 65/1013; H04W 88/16; H04W 92/00; H04W 92/02; H04W 92/06
See application file for complete search history.

(56) References Cited

U.S. PATENT DOCUMENTS

| | | | | |
|---|---|---|---|---|
| 2018/0132234 | A1* | 5/2018 | Cavalcanti | H04W 72/02 |
| 2019/0253930 | A1* | 8/2019 | Senju | G06F 9/45558 |
| 2020/0329441 | A1* | 10/2020 | Ha | H04J 3/067 |
| 2020/0389405 | A1* | 12/2020 | Mardmoeller | H04L 47/34 |
| 2021/0075675 | A1* | 3/2021 | Cavalcanti | H04L 41/0823 |
| 2021/0204172 | A1* | 7/2021 | Rost | H04L 43/026 |
| 2021/0212069 | A1* | 7/2021 | Moon | H04W 28/24 |
| 2021/0219357 | A1* | 7/2021 | Talebi Fard | H04L 67/14 |
| 2021/0226902 | A1* | 7/2021 | Li | H04L 41/0806 |
| 2021/0274375 | A1* | 9/2021 | Li | H04W 28/10 |
| 2021/0274418 | A1* | 9/2021 | Zhou | H04W 80/02 |
| 2021/0274585 | A1* | 9/2021 | Yu | H04L 67/146 |
| 2021/0306901 | A1* | 9/2021 | Mannweiler | H04W 40/246 |
| 2021/0344735 | A1* | 11/2021 | Ke | H04L 47/2491 |
| 2021/0352536 | A1* | 11/2021 | Prabhakar | H04W 76/14 |
| 2022/0239398 | A1* | 7/2022 | Li | H04W 56/0015 |
| 2023/0254755 | A1* | 8/2023 | Talebi Fard | H04W 40/246 370/256 |

FOREIGN PATENT DOCUMENTS

| | | | | |
|---|---|---|---|---|
| WO | WO-2017182086 | A1 * | 10/2017 | H04L 12/24 |
| WO | 2020 073903 | A1 | 4/2020 | |
| WO | 2020 081062 | A1 | 4/2020 | |
| WO | WO2020067977 | A1 | 4/2020 | |
| WO | 20201 03833 | A1 | 5/2020 | |
| WO | WO2020103834 | A1 | 5/2020 | |

OTHER PUBLICATIONS

3GPP TSG-SA WG2 Meeting #134; Jun. 24-28, 2019, Sapporo, Japan; Change Request; 23.501 CR 1525 rev—Current version: 16.1.0 (S2-1907208).
3GPP TSG-SA G2 Meeting #130; Kochi, India, Jan. 21-Jan. 25, 2019; Source: Huawei, HiSilicon; Title: Discussion on system enhancement for TSN logical bridge management; Agenda Item: 6.15.2 (S2-1900590).
European Search Report issued for Application No. / Patent No. 21820973.2-1216 / 4165839—Nov. 9, 2023.
Notice of Preliminary Rejection issued for Korean Patent Application No. 2022-7044973—Apr. 3, 2025.
3GPP TR 23.734 v16.2.0; Technical Report; 3rd Generation Partnership Project; Technical Specification Group Services and System Aspects; Study on enhancement of 5G System (5GS) for vertical and Local Area Network (LAN) services (Release 16)—Jun. 2019.
PCT Notification of International Preliminary Report on Patentability issued for International application No. PCT/SE2021/050529—Aug. 31, 2022.
SA WG2 Meeting #129bis; West Palm Beach, FL; Source: Nokia, Nokia Shanghai Bell; Title: KI#3.1—TSN—Definition of potential Impacts on Existing Nodes and Functionality of 5GS bridge model (S2-1811828)—Nov. 26-30, 2018.
SA WG2 Meeting #130; Kochi, India; Change Request; 23.501 CR 871 rev 2 Current version 15.4.0; Title: TSC Architecture (S2-1902060)—Jan. 21-25, 2019.
PCT International Search Report issued for International application No. PCT/SE2021/050529—Sep. 14, 2021.
PCT Written Opinion of the International Searching Authority issued for International application No. PCT/SE2021/050529—Sep. 14, 2021.
Official Action issued for Chinese Patent Application No. 202180041750.1—May 29, 2025.
3GPP TSG WG-SA3 Meeting #92; Dalian, China, Aug. 20-24, 2018; Source: Nokia, Nokia Shanghai Bell; Title: Study on Security for 5GS Enhanced support of Vertical and LAN Services; Agenda Item: 8.10 (S3-182682 (revision of S3-182445)).
Huang, Ziang et al. "Study on through-wall propagation properties of UWB electromagnetic wave"—Sep. 2014.
White Paper, 5G for Connected Industries and Automation, Second Edition—Feb. 2019.
Home, Stephan "IEC/IEEE 60802, Inter TSN domain communication concept"—May 15, 2020.
White Paper, Exposure of 5G Capabilities for Connected Industries and Automation Applications—May 2020.
Notice of Registration Procedues issued for Chinese Patent Application Serial No. 202180041750.1—Sep. 29, 2025.
3GPP TR 23.734 v16.1.0 (Mar. 2019) 3rd Generation Partnership Project; Technical Specification Group Services and System Aspects; Study on enhancement of 5G System (5GS) for vertical and Local Area Network (LAN) services (Release 16).
3GPP TS 23.501 v0.3.0 (Feb. 2017) 3rd Generation Partnership Project; Technical Specification Group Services and System Aspects; System Architecture for the 5G System; Stage 2 (Release 15).
3GPP TS 23.501 v16.4.0 (Mar. 2020) 3rd Generation Partnership Project; Technical Specification Group Services and System Aspects; System architecture for the 5G System (5GS); Stage 2 (Release 16).
EPO Communication under Rule 71(3) EPC issued for Application No. 21 820 973.2-1206—Aug. 12, 2025.
EPO Supplementary European Search Report issued for Application No. EP 21 82 0973—Oct. 31, 2023.

* cited by examiner

METHOD AND SYSTEM FOR INTERACTION BETWEEN 5G AND MULTIPLE TSC/TSN DOMAINS

PRIORITY

This nonprovisional application is a U.S. National Stage Filing under 35 U.S.C. § 371 of International Patent Application Serial No. PCT/SE2021/050529 filed Jun. 11, 2021 and entitled "Method and System for Interaction Between 5G and Multiple TSC/TSN Domains" which claims priority to U.S. Provisional Patent Application No. 63/037,656 filed Jun. 11, 2020 both of which are hereby incorporated by reference in their entirety.

TECHNICAL FIELD

The present disclosure relates, in general, to wireless communications and, more particularly, to a method and network node for system support for multiple Time Sensitive Networking (TSN) domains.

BACKGROUND

The industrial automation industry is currently undergoing a digital transformation, whereby for example multiple machines, devices, the cloud, and people are interconnected, thus making information accessible from anywhere in a factory. The resulting transparency across processes and assets transforms the production plant into a cyber-physical production system.

Time Sensitive Networks on the wireline side and 5G on the wireless side are communication technology enablers for this transformation. Both technologies are suitable for time-sensitive applications that require deterministic, reliable, and low-latency communications. Significant benefits can be achieved for industrial use cases with the introduction of TSN and 5G wireless communication, for example due to increased flexibility in the deployment of industrial equipment and the network.

FIG. 1 illustrates a single TSN system (e.g., a single TSN domain) in a wired deployment. In FIG. 1, the following traffic use cases are depicted: controller to controller (C2C), controller to device (C2D), and device to compute (D2cmp). As used herein, controller refers to a programmable logic controller (PLC), which is an application controller.

There can be three connectivity segments in the industrial automation network, as FIG. 1 shows:
Central room/edge cloud,
Local machines or a set of machines representing a production cell,
TSN backbone, which in this context refers to an industrial TSN backbone used in industrial automation.

As depicted in FIG. 1, all devices belong to one TSN domain, and are therefore managed by one Central User Configuration (CUC)/Central Network Configuration (CNC) pair. Central room is a centralized management segment where centralized control and management functions are located, e.g. centralized PLC, CNC and automation data collection. These functions typically have interactions with other devices across the entire industrial automation network. The central room can be part of an enterprise edge cloud, for example the local automation cloud. Local machine connectivity segment consists of multiple machines, as illustrated in FIG. 1 by machine #1 to machine #N. Every machine is equipped with field devices (e.g. sensors, actuators) and local PLCs. Industrial backbone provides transport service for the central management segment and the local machine segment, e.g. between an edge cloud and a field device. The connectivity service can be either between different local machines or between central management level and local machines.

A TSN network may be split into multiple domains. A CUC/CNC pair is responsible for a TSN domain. A production cell uses typically one TSN domain for communication. As a consequence, multiple CNCs may exist in the industrial automation network. FIG. 2 illustrates multiple TSN Domains. Each TSN domain is controlled and represented by a local CUC and CNC. A TSN domain is defined as a quantity of commonly managed industrial automation devices.

In FIG. 2, for example, production cell/line #1 consists of machine #1 and #2, and both machines belong to TSN domain #1. By contrast, in production cell/line #2, each machine may belong to an independent TSN domain. There is also a TSN domain #4 for the backbone network, also referred to as a TSN backbone domain 61. The CNC4 in the backbone network of FIG. 2 has higher hierarchy than other CNCs in the local production cells. To allow communication between nodes in different TSN domains, there is a need to create TSN streams that cross TSN domain boundaries, which may also be known as inter TSN domain communication. Lower hierarchy CNCs can escalate inter-TSN stream establishment requests between TSN domains to the CNC of a higher hierarchy level, which then can configure the inter-TSN streams, also referred to as TSN stream paths, between TSN domains which are lower in hierarchy.

3GPP TS 23.501 v. 16.4.0 has defined an architecture to support $5^{th}$ Generation-Time Sensitive Networking (5G-TSN) integration. Specifically, FIG. 3 illustrates the 3GPP 5G-TSN architecture. The TSN system control and management interacts with a $5^{th}$ Generation System (5GS) via an Application Function (AF) function, where the TSN system can be a TSN network, a TSN bridge, or an end station. The control and management (C&M) of the TSN system can be a pair of CUC/CNC, which can be implemented as part of a Software-Defined Networking (SDN) controller. 3GPP TS 23.501 also specifies a 5GS bridge model for supporting Time Sensitive Communication (TSC) and/or TSN, also referred to as the Rel-16 bridge model. It is specified that a 5G system can be integrated with the external network as a TSN bridge, such TSN bridge often referred to as a logical or virtual TSN bridge. A virtual TSN bridge includes TSN Translator functionality for interoperation between TSN System and 5G System, both for user plane and control plane.

For example, FIG. 4 illustrates the 3GPP bridge model from 3GPP TS 23.501. A network side TSN translator (NW-TT) port at a User Plane Function (UPF) and a device side TSN translator (DS-TT) port at a User Equipment (UE) act as ports of the virtual TSN bridge of FIG. 4.

SUMMARY

Certain problems exist with previous methods and systems providing system support for multiple TSN Domains. For example, a first problem may be that there is no solution to how to adapt 5GS to support and interact with multiple TSC/TSN domains. As another example, a second problem may be that, according to 3GPP TS 23.501 V16.4.0, 5GS virtual bridge, "It is assumed that all Protocol Data Unit (PDU) sessions which connect to the same TSN network via a specific UPF are handled by the same TSN AF." That is, according to 3GPP TS 23.501, when deployed in a TSN System, the 5G System virtual bridge can only interact with a single CNC.

As discussed above, the current Rel-16 3GPP model defines a one-to-one mapping between 5GS virtual bridge and UPF. This leads to the need of a larger number of UPFs, when the number of TSN domains is equal to the number of industrial machines (i.e., the required number of UPFs is same as the number of machines). This one-to-one mapping between 5GS virtual bridge and UPF hence hinders scalability and flexibility of the system, and also creates a network management issue.

Certain aspects of the present disclosure and their embodiments may provide solutions to these or other challenges. For example, according to certain embodiments, a method is provided specifying how 5GS can interact with multiple TSN domains and multiple non-3GPP network controllers.

According to certain embodiments, a method by a network node includes determining how many TSC and/or TSN domains that exist in a network. The network node instantiates at least one virtual bridge, where each virtual bridge serves at least one TSC and/or TSN domain.

In some embodiments, the network node instantiates at least one virtual bridge for each one of the plurality of TSC and/or TSN domains. The network node is typically a node in a wireless communications network system, wherein the network node provides for interaction between the wireless communications system and multiple TSN domains and non-3GPP network controllers. The network node may for example be a core network node, such as an application function (AF) or an Operations & Maintenance node (OAM), or another node providing network management functions.

According to certain embodiments, a network node includes processing circuitry configured to determine how many TSC and/or TSN domains exist in a network comprising a plurality of TSC and/or TSN domains and instantiate at least one virtual bridge for each one of the plurality of TSC and/or TSN domains.

According to certain embodiments, a method performed by a network node includes determining a group of ports in a network system and dynamically modeling a first virtual bridge for the group of ports. The method decouples the one to one mapping between 5G virtual bridge and UPF (current 3GPP rel-16 solution), and allows multiple 5GS virtual bridges to be modelled even if one UPF is present.

According to certain embodiments, a network node includes processing circuitry configured to determine a group of ports in a network system and dynamically model a first virtual bridge for the group of ports.

Certain embodiments may provide one or more of the following technical advantages. For example, certain embodiments propose a new solution for 5GS to support multiple TSN domains. For example, certain embodiments propose that a network management function in 5GS (e.g. core network node, AF or OAM) can detect or identify how many external TSC/TSN domains exist (e.g. how many CNCs exist). Then the network management function can instantiate a required number of 5GS bridges to serve different TSC/TSN domains. For example, the network management function in a 5GS may interact with a non-3GPP network controller (e.g. CNC) based on overall network topology information. The network management function in 5GS may also decide how many 5GS bridges and ports are needed for a TSN domain. Thus, one technical advantage may be that 5GS can provide support for inter-TSN-domain communication among different TSN domains. Another technical advantage may be that 5GS can provide communication within one TSN domain. Still another technical advantage may be that certain embodiments support hierarchical network configuration.

As another example, certain embodiments propose a port grouping-based 5G virtual bridge model, and the 5GS can dynamically model a virtual bridge based on a group of ports of the 5GS. This dynamic modelling may for example be formed by a network management function in the 5GS. According to certain embodiments, the 5GS can associate the group of ports with a bridge ID, which may be reported at AF or other 3GPP network nodes. Thus, a 5GS virtual bridge may be modelled "per set of ports of a UPF." Thus, one technical advantage may be that certain embodiments support interaction with multiple CNCs, such that all 5GS ports may be divided flexibly into several groups, and every group of ports may be managed by a CNC of a TSN domain. Another technical advantage may be that the bridge may be dynamically scaled up and down depending on how many ports are reported at AF, and the bridge may be reconfigurable. Still another technical advantage may be that a one to one mapping between 5G virtual bridge and UPF is no longer necessary.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
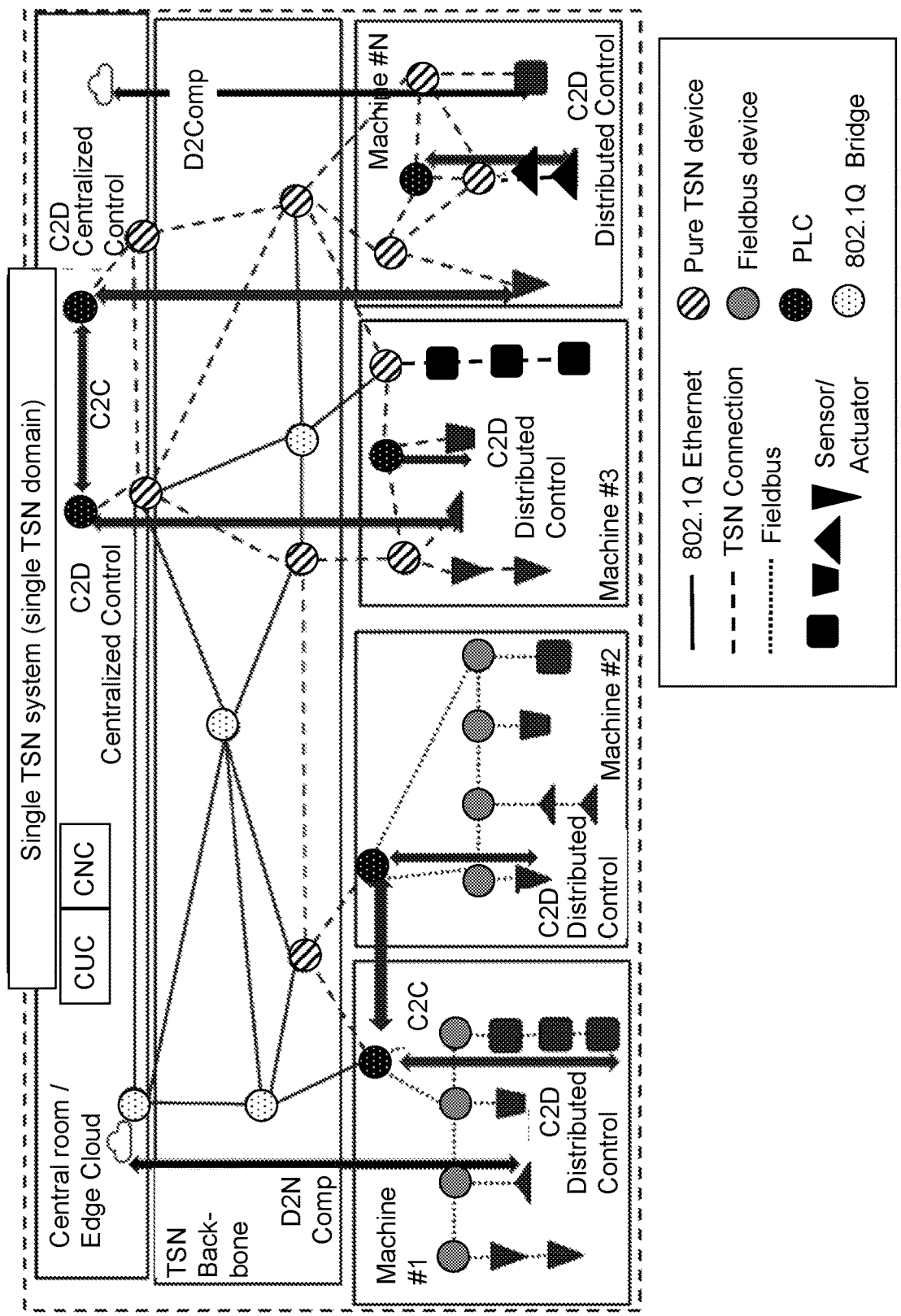
FIG. 1 illustrates a single TSN Domain in a wired deployment, using wired communication.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In some embodiments, a more general term "network node" may be used and may correspond to any type of radio network node or any network node, which communicates with a User Equipment (UE) (directly or via another node) and/or with another network node. Examples of network nodes are NodeB, Master eNodeB (MeNB), a network node belonging to master cell group (MCG) or secondary cell group (SCG), base station (BS), multi-standard radio (MSR) radio node such as MSR BS, eNodeB (eNB), gNodeB (gNB), network controller, radio network controller (RNC), base station controller (BSC), relay, donor node controlling relay, base transceiver station (BTS), access point (AP), transmission points, transmission nodes, Remote Radio Unit (RRU), Remote Radio Head (RRH), nodes in distributed antenna system (DAS), core network node (e.g. Applications Function (AF), Session Management Function (SMF), User Plane Function (UPF), Network Exposure Function (NEF), etc.), Operations & Maintenance (OAM), Operations Support System (OSS), Self Optimized Network (SON), positioning node (e.g. Evolved-Serving Mobile Location Centre (E-SMLC)), Minimization of Drive Tests (MDT), test equipment (physical node or software), etc.

In some embodiments, the non-limiting term user equipment (UE) or wireless device may be used and may refer to any type of wireless device communicating with a network node and/or with another UE in a cellular or mobile communication system. Examples of UE are target device, device to device (D2D) UE, machine type UE or UE capable of machine to machine (M2M) communication, Personal Digital Assistant (PDA), Tablet, mobile terminals, smart phone, laptop embedded equipped (LEE), laptop mounted equipment (LME), Unified Serial Bus (USB) dongles, UE category M1, UE category M2, Proximity Services (ProSe) UE, Vehicle-to-Vehicle (V2V) UE, Vehicle-to-Anything (V2X) UE, etc.

Additionally, terminologies such as base station/gNodeB and UE should be considered non-limiting and do in particular not imply a certain hierarchical relation between the two; in general, "gNodeB" could be considered as device 1 and "UE" could be considered as device 2 and these two devices communicate with each other over some radio channel. And in the following the transmitter or receiver could be either gNB, or UE.

According to certain embodiments, new solution(s) for 5GS to support multiple TSN domains are provided.

For example, according to certain embodiments, a network management function in 5GS (core network node, such as, for example, Applications Function (AF), or Operations & Maintenance (OAM), or 5G Exposure Interfaces defined by 5G-Alliance for Connected Industries and Automation (5G-ACIA) operates to detect or identify or is otherwise configured with how many external TSC/TSN domains exists (e.g. how many CNCs exists). The network management function is also configured for instantiation of the number of 5GS bridges (including corresponding Network Functions (NFs)) to serve different TSC/TSN domains.

With 3GPP rel-16 5GS bridge model, the 5GS bridge instantiation is corresponding to UPF virtual network function (VNF) instantiation.

According to certain embodiments, a method is proposed to model the 5G virtual bridge based on a set of ports of 5GS. The method decouples the one to one mapping between 5G virtual bridge and UPF (current 3GPP rel-16 solution), and allows multiple 5GS virtual bridges to be modelled even if one UPF is present.

According to certain embodiments, for example, 5GS may interact with a non-3GPP network controller (e.g., CNC) based on, for example, overall network topology information, geographical location of the 5G system port (e.g., UE/DS-TT is a 5GS port), Virtual Local Area Network (VLAN), Data Network Name (DNN), and Single-Network Slice Selection Assistance Information (S-NSSAI). The 5GS may then decide or determine how many 5GS bridges should serve a TSN domain, as well as which 5G bridge and ports should serve the TSN domain.

The term TSC/TSN domain is herein used to refer to a domain that is a TSC domain or a TSN domain. As an umbrella term, time sensitive intercommunication domain could also be used to refer to a domain that is a TSC or a TSN domain.

The terms 5G virtual bridge, 5GS virtual bridge, 5GS bridge and TSN bridge are used herein to refer to a logical or virtual bridge which is implemented by use of a 5GS.

An embodiment of a 5G virtual bridge includes TSN Translator functionality for interoperation between a TSN network and a 5GS, for the user plane as well as the control plane. In this embodiment, 5GS TSN translator functionality comprises a DS-TT and a NS-TT, while 5GS specific procedures in 5GC and Radio Access Network (RAN), wireless communication links, etc. remain hidden from the TSN network. To achieve such transparency to the TSN network, so that the 5GS appears as any other TSN bridge, the 5GS provides TSN ingress and egress ports 17 via DS-TT and NW-TT. The 5G virtual bridge of this embodiment comprises ports on the UPF side, the user plane tunnel between the UE and UPF, and the ports on the DS-TT side. For each 5G bridge of a TSN network, the ports on NW-TT support the connectivity to the TSN network, and the ports on DS-TT side are associated to the PDU Sessions providing connectivity to the TSN network. DS-TT and/or NS-TT may, in one implementation, be Ethernet ports operating in accordance with an Ethernet protocol, e.g. IEEE 802.1Q.

In one embodiment, 5GS associate ports 17, e.g. DS-TTs and NW-TTs, with a bridge ID and report the bridge ID to its network management function such as, for example, an AF or other 3GPP network node. This adds flexibility to the 5G virtual bridge when, for example, a UE and/or connected devices (e.g., mobile robot) are serving in a specific TSN domain. The UE (or DS-TT) and the port to which it is connected at the network side (UPF side NW-TT port) can be modelled in a 5G virtual bridge that serves this TSN domain. However, when the same UE moves to another TSN domain, the UE acting as a port of the 5G bridge can be modelled to another 5G bridge serving another TSN domain.

As is illustrated in FIGS. 5-13, a 5G virtual bridge can co-exist with wired connections.

The instantiation of a 5GS bridge may be according to either of two alternatives, which are described in more detail below.

Figure 5:
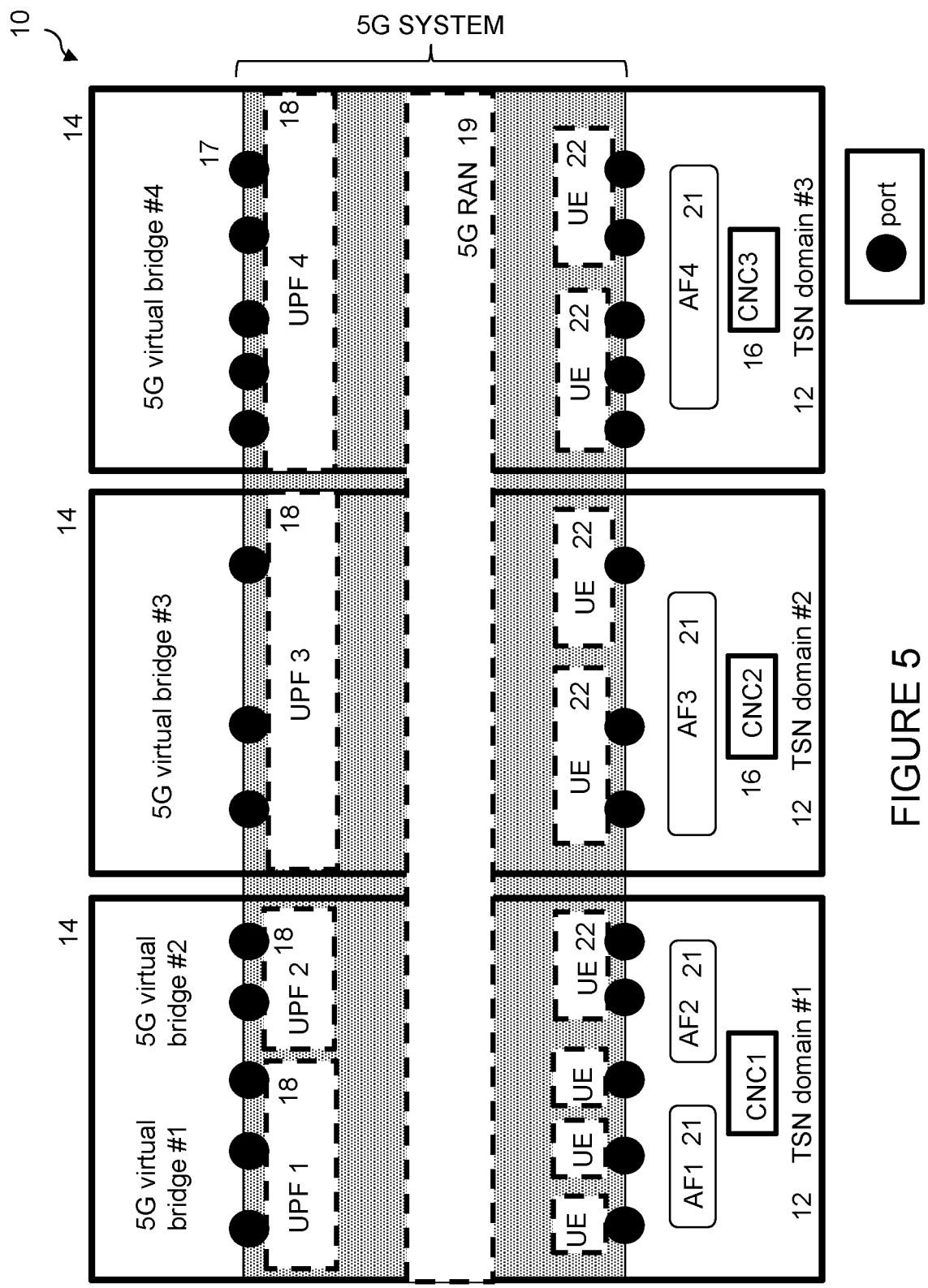
FIG. 5 illustrates 5GS support for multiple TSN domains, according to certain embodiments.

As mentioned above, certain embodiments extend the 3GPP Rel-16 5GS bridge model to include 5GS bridge instantiation, which may correspond to UPF VNF (virtual network function) instantiation. For example, the bridge model of Rel-16 may be followed such that there is at least one UPF per TSN domain. FIG. 5 illustrates an example system 10 showing 5GS support for multiple TSN domains 12, according to certain embodiments. In the embodiment shown in FIG. 5, one 5G virtual bridge 14 is provided per UPF 18, while a TSN domain 12 may comprise one or more UPFs 18. In the embodiment shown in FIG. 5, the 3GPP Rel-16 model is further developed such that one or more 5GS bridges 14 are separately managed by different CNCs 16 for different TSN domains 12. Specifically, as shown in the example illustrated in FIG. 5, four 5G virtual bridges 14 are managed by three CNCs 16.

Certain embodiments described herein relate to 5GS bridge instantiation. Specifically, when a 5GS network management function 19 detects multiple TSN domains 12, the 5GS network management function 19 decides how many ports 17 and UPFs 18, as well as which ports 17 and UPFs 18 are needed for a specific TSN domain 12. The 5GS network function 19 can then instantiate UPF functions.

According to certain other embodiments, a port grouping-based bridge model may be used.

With the proposed port-based 5G virtual bridge model, a 5GS can dynamically model a virtual bridge based on a group of ports of the 5G system. A 5GS port can be an ingress or egress port. Additionally, the 5GS port can be either a UPF (NW-TT) port or a UE (DS-TT) port. 5GS can associate those ports with a bridge ID and report the bridge ID to a network management function such as, for example, an AF or other 3GPP network node. This adds flexibility to the 5G virtual bridge when, for example, a UE 22 and/or connected devices (e.g., mobile robot) are serving in a specific TSN domain. The UE (or DS-TT) and its connected port 17 at the network side (UPF side NW-TT port) can be modelled in a 5G virtual bridge that serves this TSN domain. However, when the same UE 22 moves to another TSN domain, the UE 22 acting as a port of the 5G bridge can be modelled to another 5G bridge serving another TSN domain.

Figure 6:
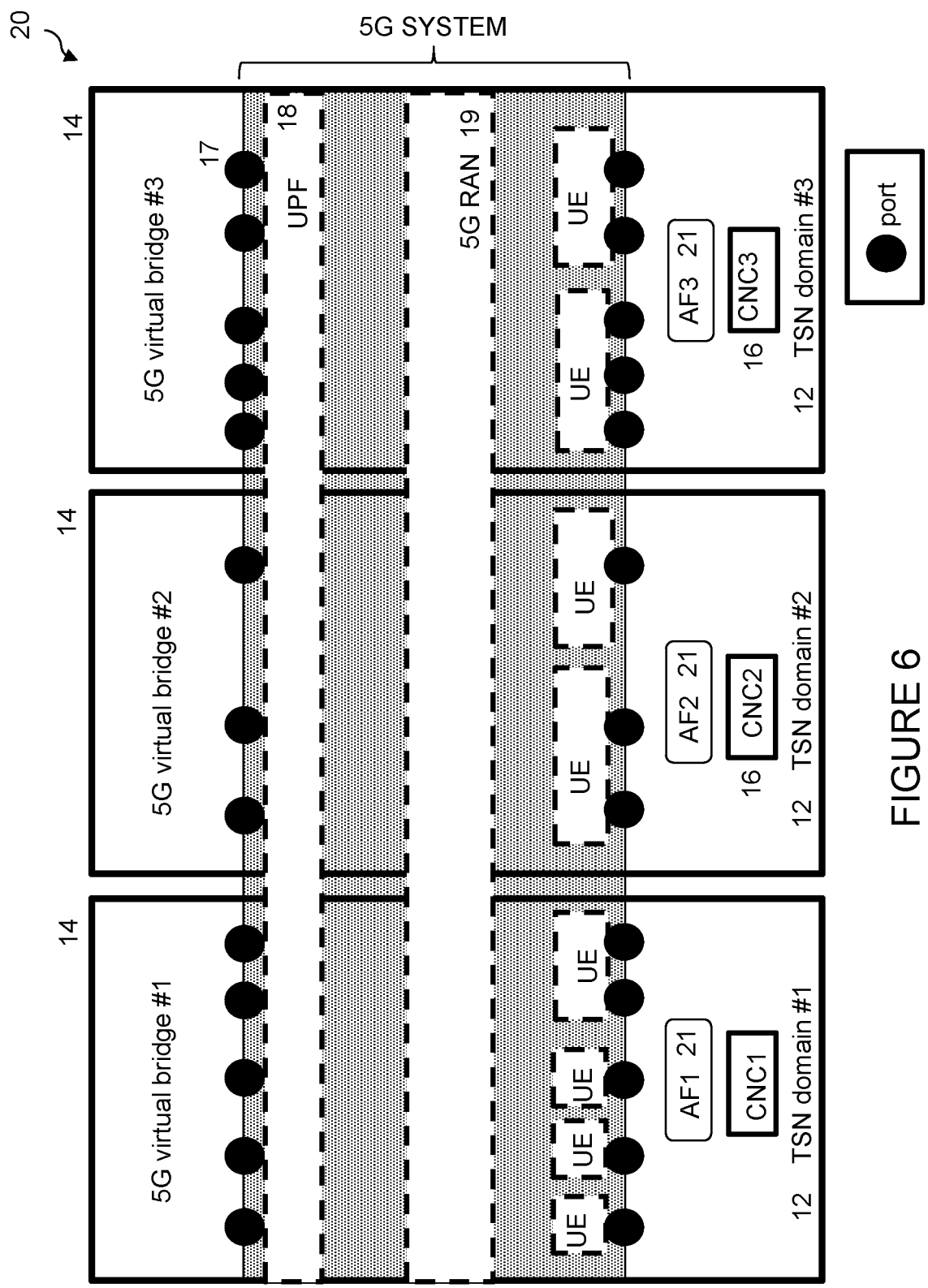
FIG. 6 illustrates an example 5GS having one UPF but modelled as multiple virtual bridges, according to certain embodiments.

FIG. 6 illustrates an example system 20 having one UPF 18, according to certain embodiments. More specifically, FIG. 6 illustrates a port grouping-based 5GS bridge model with one UPF 18, wherein one UPF 18 is shared between a plurality of 5G virtual bridges 14. The ports 17 that belong to UPF 18 can, in this embodiment, serve different 5G virtual bridges 14. In the example of FIG. 6, three virtual bridges 14 are modeled based on three groups of ports. As depicted in FIG. 6, all ports 17 belonging to a TSN domain are considered a group of ports. Thus, since the example system 20 of FIG. 6 includes three domains, the system 20 has three groups of ports. Each group of ports forms a virtual bridge 14.

Ports 17 can be either at UPF side (or NW-TT port) or UE side (or DS-TT port). According to certain embodiments, 5GS, e.g. 5GS RAN 19, selects a set of ports 17 and assigns a bridge ID associated with those ports. The port and bridge management information may be reported to an AF 21, which may be dedicated for a virtual bridge 14. Every virtual bridge 14 may be managed by a dedicated CNC 16 from different TSN domains 12.

Figure 7:
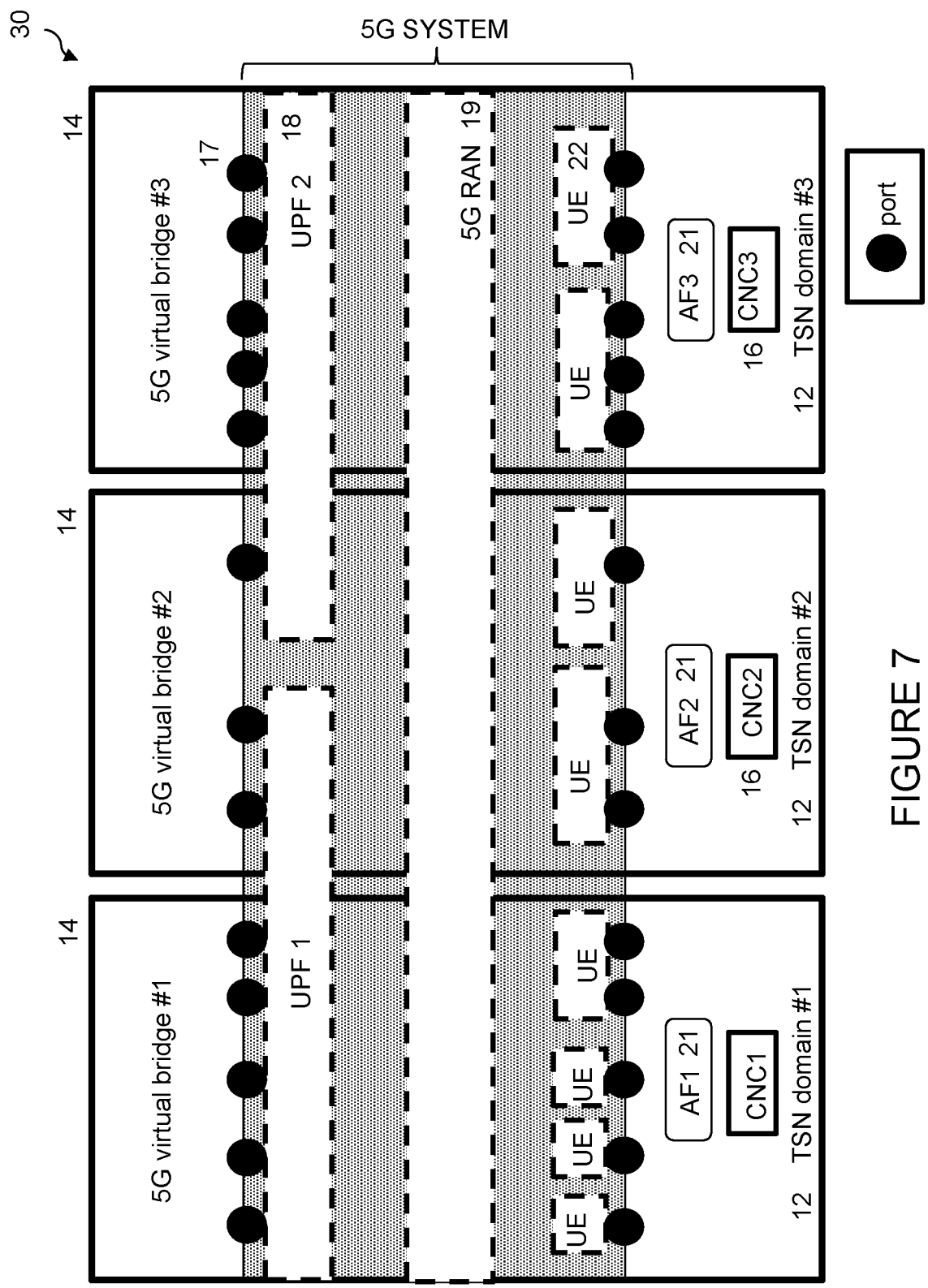
FIG. 7 illustrates a variation of the example of FIG. 6 where there are multiple UPFs, according to certain embodiments.

FIG. 7 illustrates another example system 30 that includes multiple UPFs 18, according to certain embodiments. In one embodiment of system 30, a 5G virtual bridge 14 may be served by ports 17 belonging to different UPFs 18. More specifically, FIG. 7 illustrates an example system 30 that includes two UPFs 18, where three virtual bridges 14 are modeled based on three groups of ports. Similar to FIG. 6 described above, port grouping is based on 5GS bridge model. Thus, the modelling of a 5G virtual bridge 14 can be still be based on the group of ports. For example, in this case, the 5G virtual bridge #2 involves two UPFs 18, and the 5G communication in the TSN domain #2 12 may involve UPF-to-UPF communication such as, for example, on a N19 interface between UPFs (not depicted).

Figure 8:
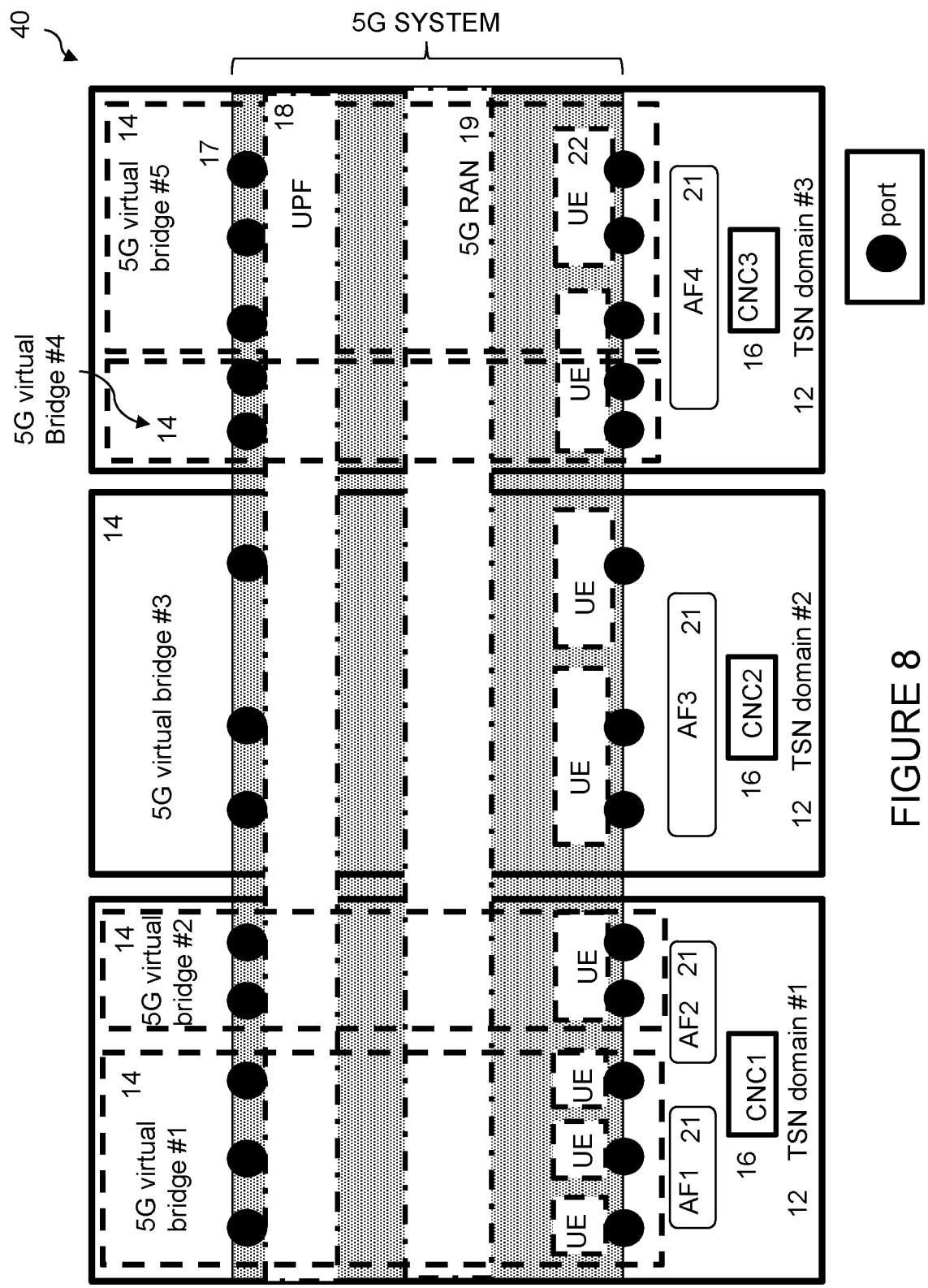
FIG. 8 illustrates another example variation of FIG. 6, where more than one virtual bridge can be managed by one CNC of a TSN domain, according to certain embodiments.

FIG. 8 illustrates another example system 40 demonstrating a port grouping-based 5GS bridge model, according to certain embodiments, wherein one UPF 18 is shared between a plurality of 5G virtual bridges 14. The ports 17 that belong to UPF 18 can, in this embodiment, serve different 5G virtual bridges 14. More specifically, FIG. 8 illustrates another example variation of FIG. 6, where more than one virtual bridge 14 can be managed by one CNC 16 of a TSN domain 12. In other words, a TSN domain 12 can in this embodiment have one or more 5G virtual bridges 14.

According to certain embodiments, port and bridge management information of virtual bridges 14 of a TSN domain 12 can be either reported to different AFs 21 (as bridge #1 14 to AF #1 21 and bridge #2 14 to AF #2 21 in TSN domain #1 12) or to only one AF 21 (as TSN domain #3 12 shows where bridge #4 and #5 14 are reported to a single AF #4 21).

According to the current Rel-16 3GPP definition, every 5GS bridge 14 only interacts with a TSN system via one TSN AF 21, which is shown in TSN domain #1 12. According to certain embodiments, an option is provided for multiple virtual bridges 14 to share one TSN AF 21, with one AF 21 per TSC/TSN domain 12.

Figure 9:
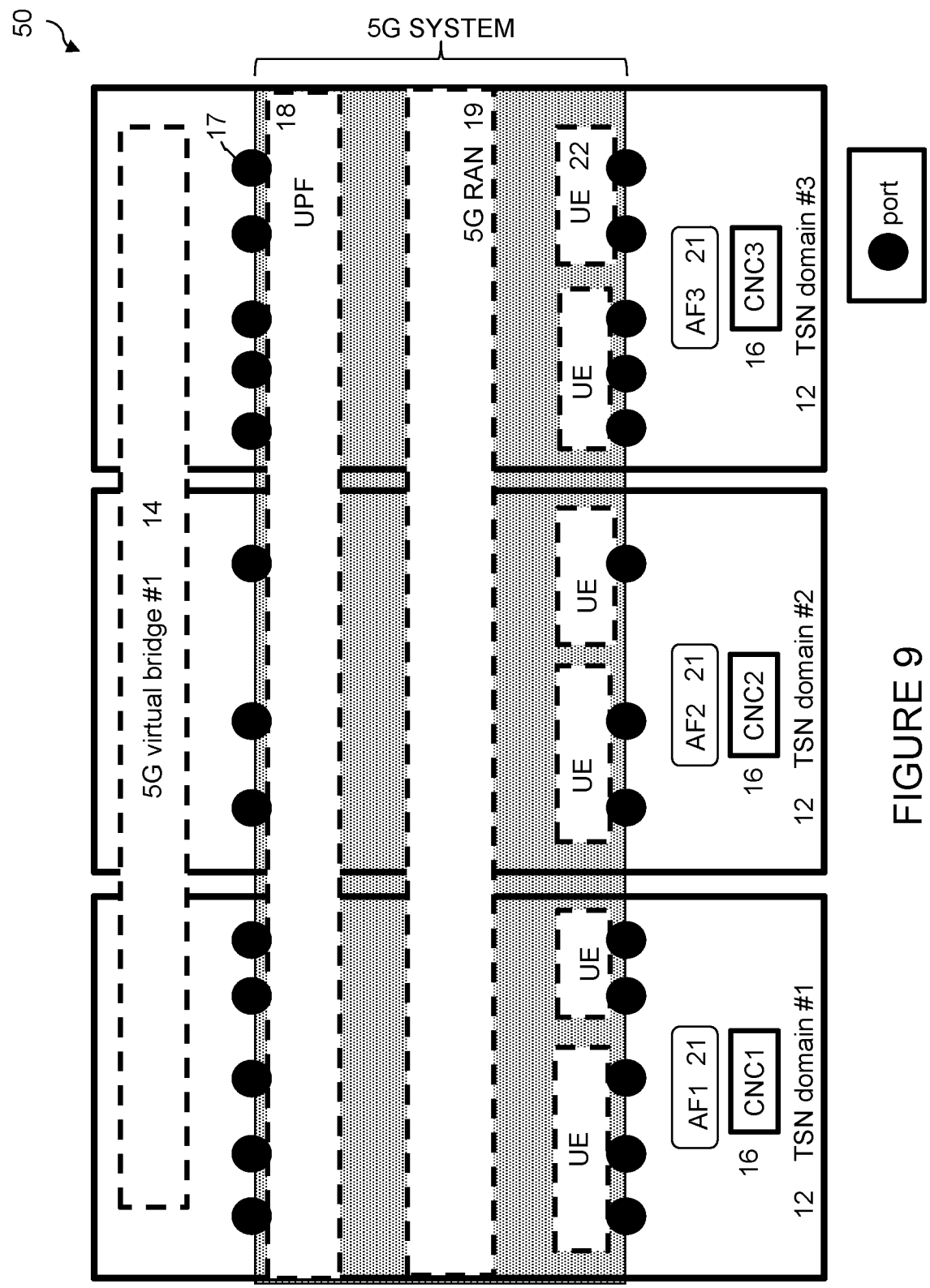
FIG. 9 illustrates another example variation of FIG. 6, where only one 5GS virtual bridge is modelled (one bridge ID may be assigned), according to certain embodiments.

FIG. 9 illustrates another example system 50 that is a variation of FIG. 6, where only one 5GS virtual bridge 14 is modelled (one bridge ID may be assigned) to serve more than one TSN domain 12. The number of UPF ports 17 are segmented into groups, which are assigned to TSN domains 12 (for example by slicing). Individual groups are configured by a separate CNC 16.

According to certain embodiments, port and bridge management information of the single virtual bridge 14 can be reported to different AFs 21. An AF 21 manages a group of ports 17 that are only accessible and configurable by a specific CNC 16.

In certain embodiments, port and bridge management information may be reported by a single AF 21 (not showing in FIG. 9). However, isolation of different group of ports is needed such that, for example, a set of ports 17 can be only accessible/configurable by a certain CNC 16.

Some additional scenarios are now described to further illustrate the solutions, techniques, and embodiments associated with the embodiments described in relation to FIG. 5 above.

Figure 2:
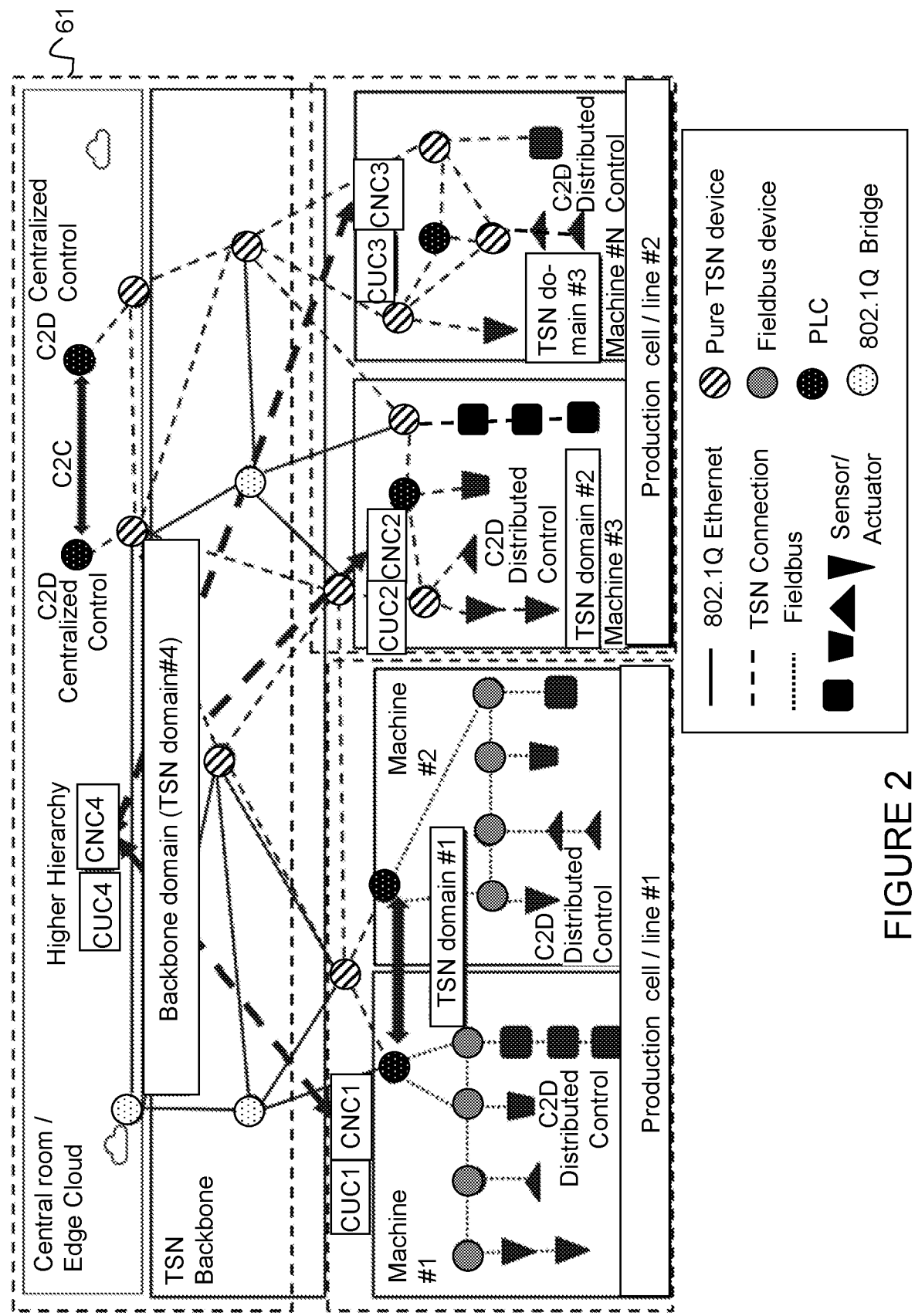
FIG. 2 illustrates multiple TSN Domains in a wired deployment, using wired communication.
Figure 10:
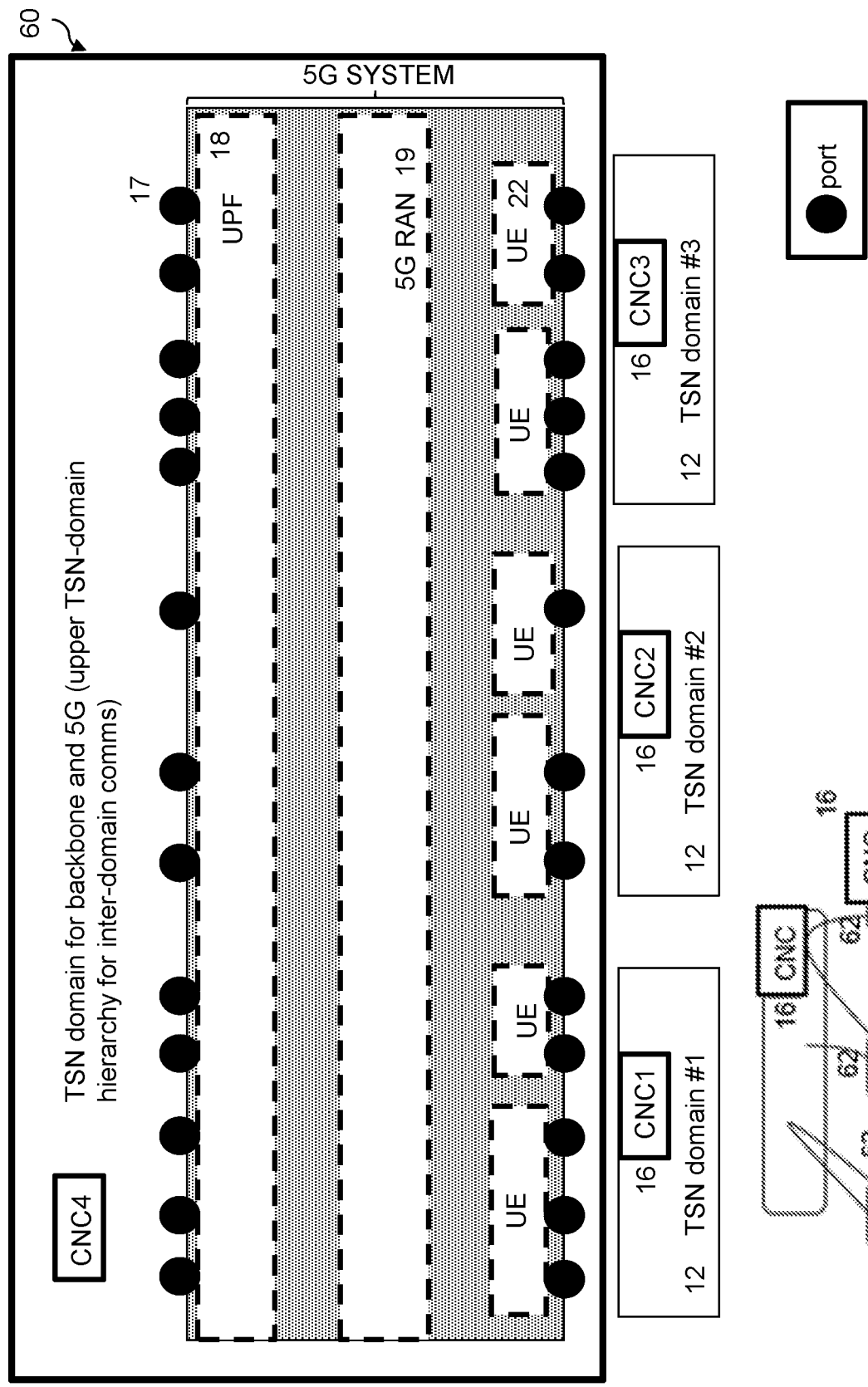
FIG. 10 illustrates an example hierarchical CNC architecture, where a 5G virtual bridge is part of a TSN backbone domain, according to certain embodiments.

For example, FIG. 10 illustrates another example system 60 that shows an example hierarchical CNC architecture where 5G virtual bridge is part of TSN backbone domain 61, such as for example the TSN backbone domain illustrated in FIG. 2. As illustrated in FIG. 10, a 5G Virtual bridge(s) 14 is part of "higher" TSN domain (backbone domain 61) with indicated TSN stream 62 for, for example, C2C, C2D, D2Cmp. The TSN backbone domain 61 provides transport and connectivity service between TSN domains 12 (such as TSN domains #1, #2, #3). The interaction between the TSN backbone domain 61 and other TSN domains 12 using 5G would become inter-TSN-domain communication.

In the illustrated example system 60, the inter-TSN-domain communication between TSN domains 12 (such as TSN domains #1, #2, #3) can be through TSN backbone domain 61. In certain embodiments, the CNC #4 16 may have higher hierarchy than CNC #1-3 16. When there is a need of communication between a device in TSN domain #1 and a device in TSN domain #2, the CNC #1 and CNC #2 can send requests to CNC #4. CNC #4 can configure the corresponding ports 17 and connectivity inside 5G (i.e. configure the 5G bridge and corresponding ports 17) so as to provide 5G connectivity between TSN domain #1 and TSN domain #2, according to the request. Then CNC #1 and #2 can configure their local connectivity to deliver data to the corresponding devices inside their own domain.

Figure 11:
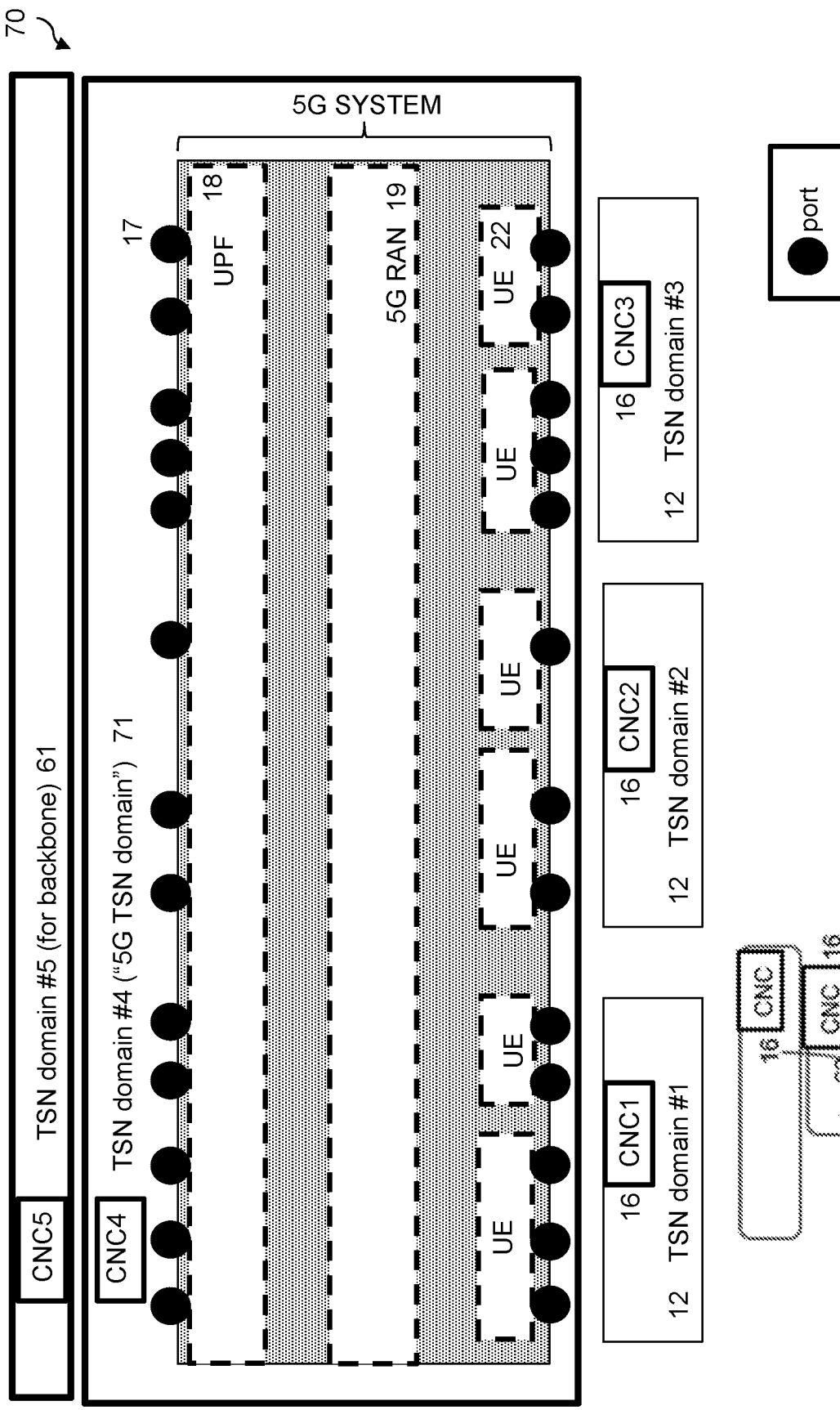
FIG. 11 illustrates an example 5GS virtual bridge acting as an individual TSN domain of its own, according to certain embodiments.

FIG. 11 illustrates another example system 70 that includes a 5GS virtual bridge which acts as an individual 5G TSN domain 71 of its own. A system 70 can include a 5G TSN domain 71 formed by one or more 5GS virtual bridges.

As depicted, TSN domain #1, #2, #3 12 are local production domains. TSN domain #5 can be a TSN backbone (e.g. a TSN backbone domain 61) for connecting industrial edge cloud network or another wired network.

In this case, the 5G TSN domain 71 provides two types of services using 5G:

Connectivity/transport service between TSN domain #1, #2, #3

Connectivity/transport service between local production domains (TSN domain #1, #2, #3) and TSN domain #5 (e.g. a TSN backbone domain 61).

In one embodiment, the CNC #4 16 has higher hierarchy than CNC #1, #2, #3 and #5 16. In this embodiment, CNC #4 can configure the 5G connectivity inside 5G TSN domain 71 according to the request from other TSN domains.

Figure 12:
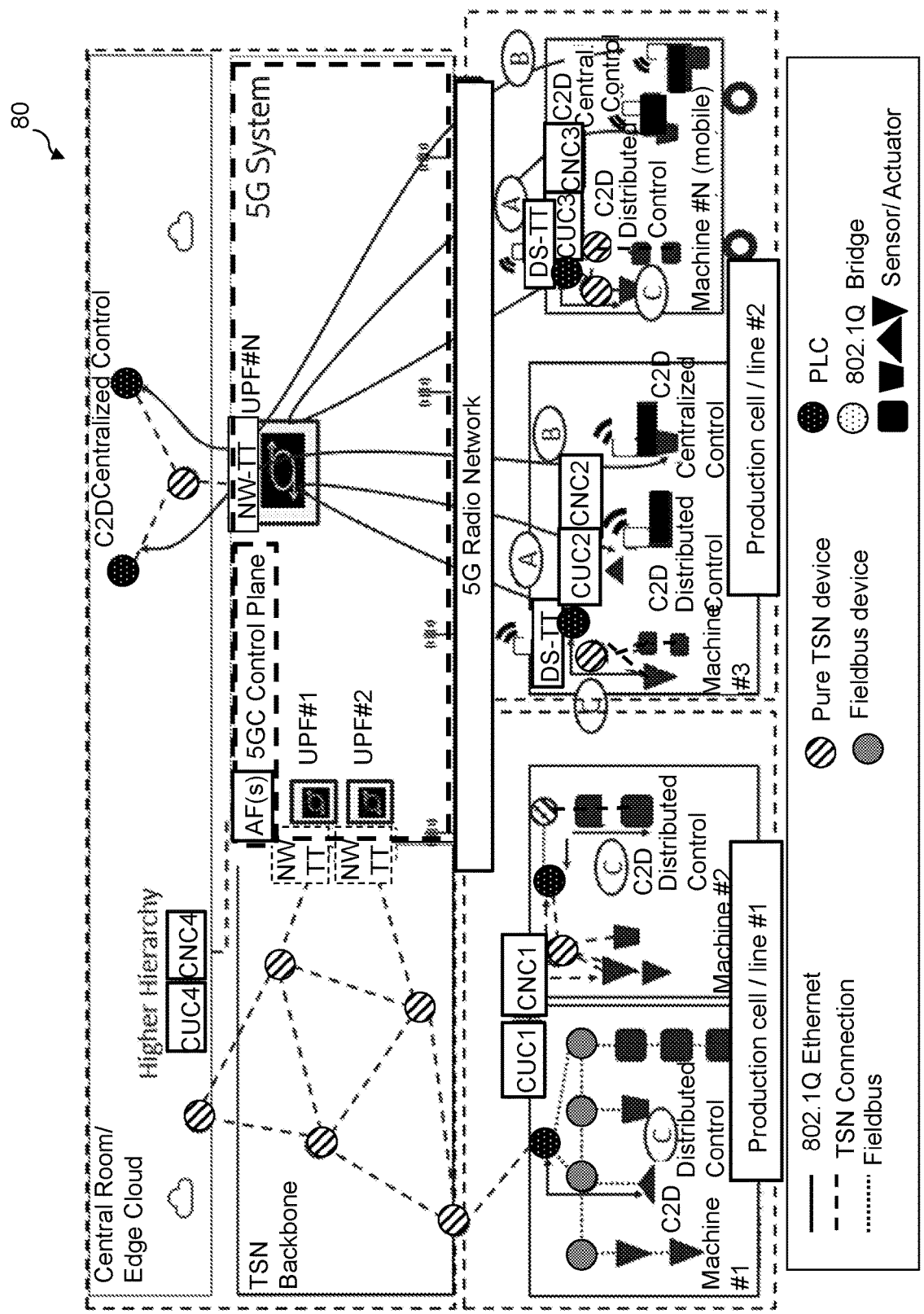
FIG. 12 illustrates 5GS virtual bridges interacting with multiple TSC/TSN domains according to certain embodiments.
Figure 13:
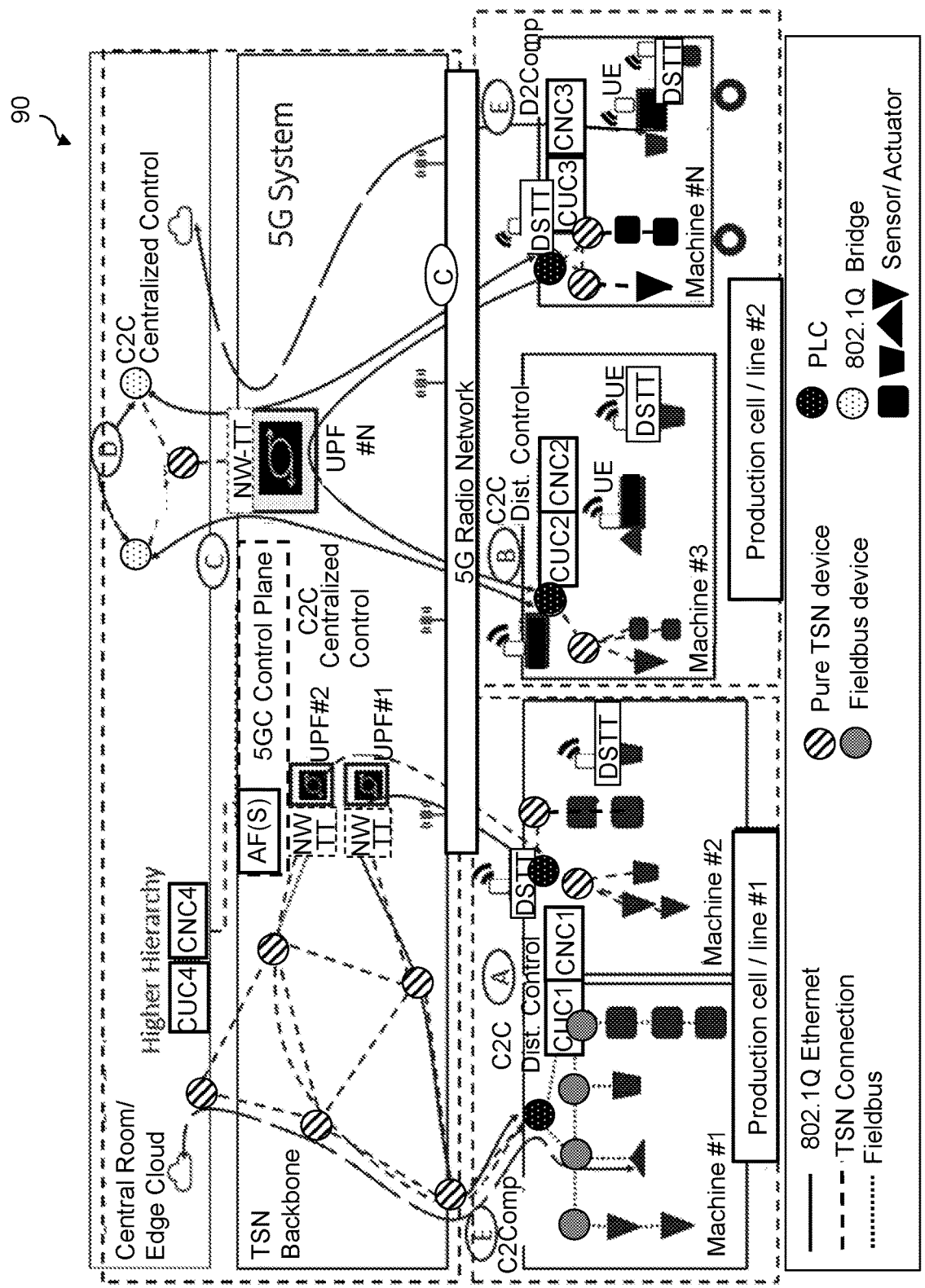
FIG. 13 illustrates 5GS virtual bridges interacting with multiple TSC/TSN domains according to certain embodiments.

FIGS. 12 and 13 illustrate examples of use cases for industrial automation. The letters A-E in FIGS. 12 and 13 indicate interconnections between different entities, for example a D2D interconnection, a Controller-to-controller (C2C) interconnection, or a device-to-computer (D2comp) interconnection. FIGS. 12 and 13 may be mapped to industrial use cases such as those described in the background. More specifically, FIG. 12 illustrates an example system 80 showing 5GS virtual bridges interacting with multiple TSC/TSN domains. Certain of the lines are industrial controller to device (C2D) use-cases in industrial automation and are shown as solid lines with arrow endings. In the case of local communication such as, for example, within one TSN domain and more specifically such as that inside machine #3, the 5GS provides interconnection "A" between a PLC and a field device via UE-to-UE communication. This 5GS connection is controlled by local CNC2.

FIG. 13 illustrates an example system 90 showing how 5GS virtual bridges interacting with multiple TSC/TSN domains. Certain of the lines are controller to controller (C2C) use cases in industrial automation and are shown as solid lines with arrow endings.

The 5GS is prepared to interact with different CNCs. As described above, this can be done, for example, by having different CNCs configuring different groups of port pairs of the 5GS virtual bridge or by separating the 5GS into multiple virtual bridges that are managed by different CNCs. A port pair refers to two ports at two different entities, e.g. a DS-TT port and a NW-TT port; two DS-TT ports at different devices; or two NW-TT ports at different UPFs. In the case of inter TSN domain communication, the CNC that is higher in hierarchy can configure TSN stream paths between TSN domains located lower in the hierarchy (e.g. between machines), or between a backbone TSN domain and a local TSN domain. Since the 5GS is interacting with all CNCs, all CNC configurations can be made through the 5GS.

Figure 14:
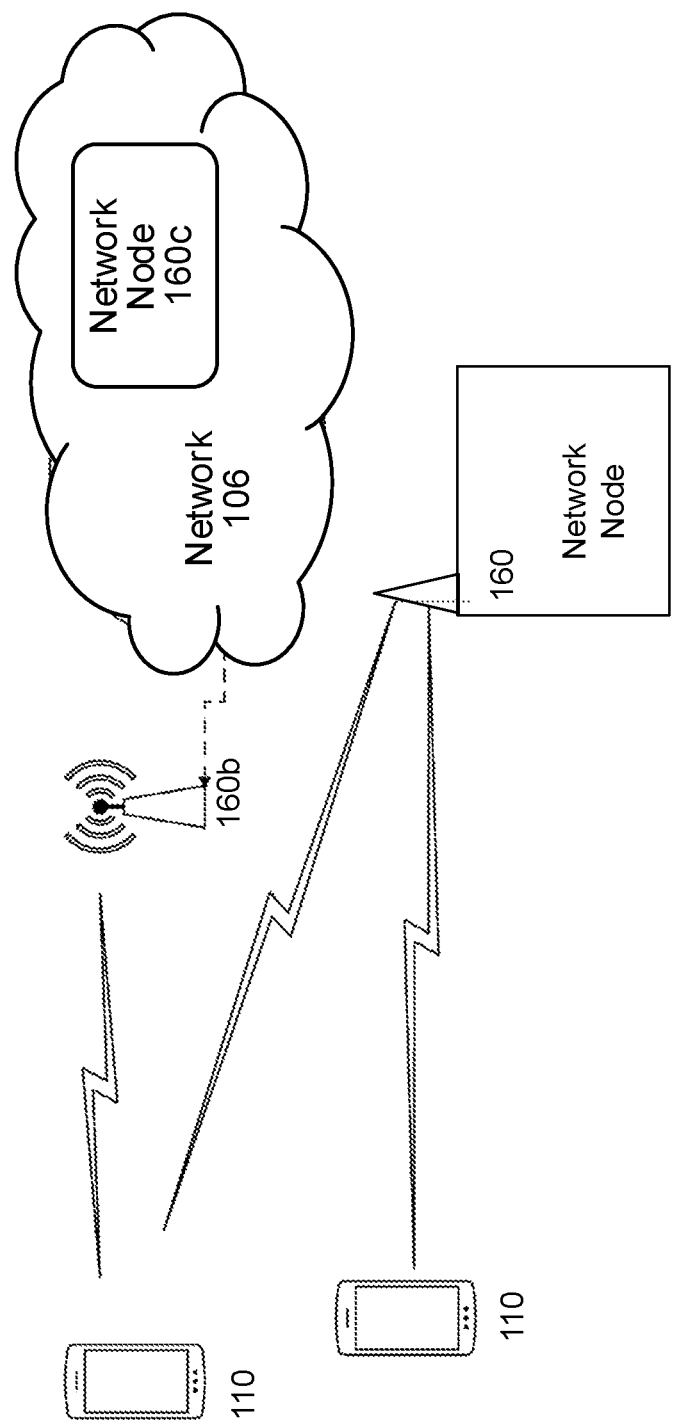
FIG. 14 illustrates an example wireless network, according to certain embodiments.

FIG. 14 illustrates a wireless network, in accordance with some embodiments. Although the subject matter described herein may be implemented in any appropriate type of system using any suitable components, the embodiments disclosed herein are described in relation to a wireless network, such as the example wireless network illustrated in FIG. 14. For simplicity, the wireless network of FIG. 14 only depicts network 106, network nodes 160 and 160b and 160c, and wireless devices 110. In practice, a wireless network may further include any additional elements suitable to support communication between wireless devices or between a wireless device and another communication device, such as a landline telephone, a service provider, or any other network node or end device. Of the illustrated components, network node 160 and 160c and wireless device 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/ or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Figure 3:
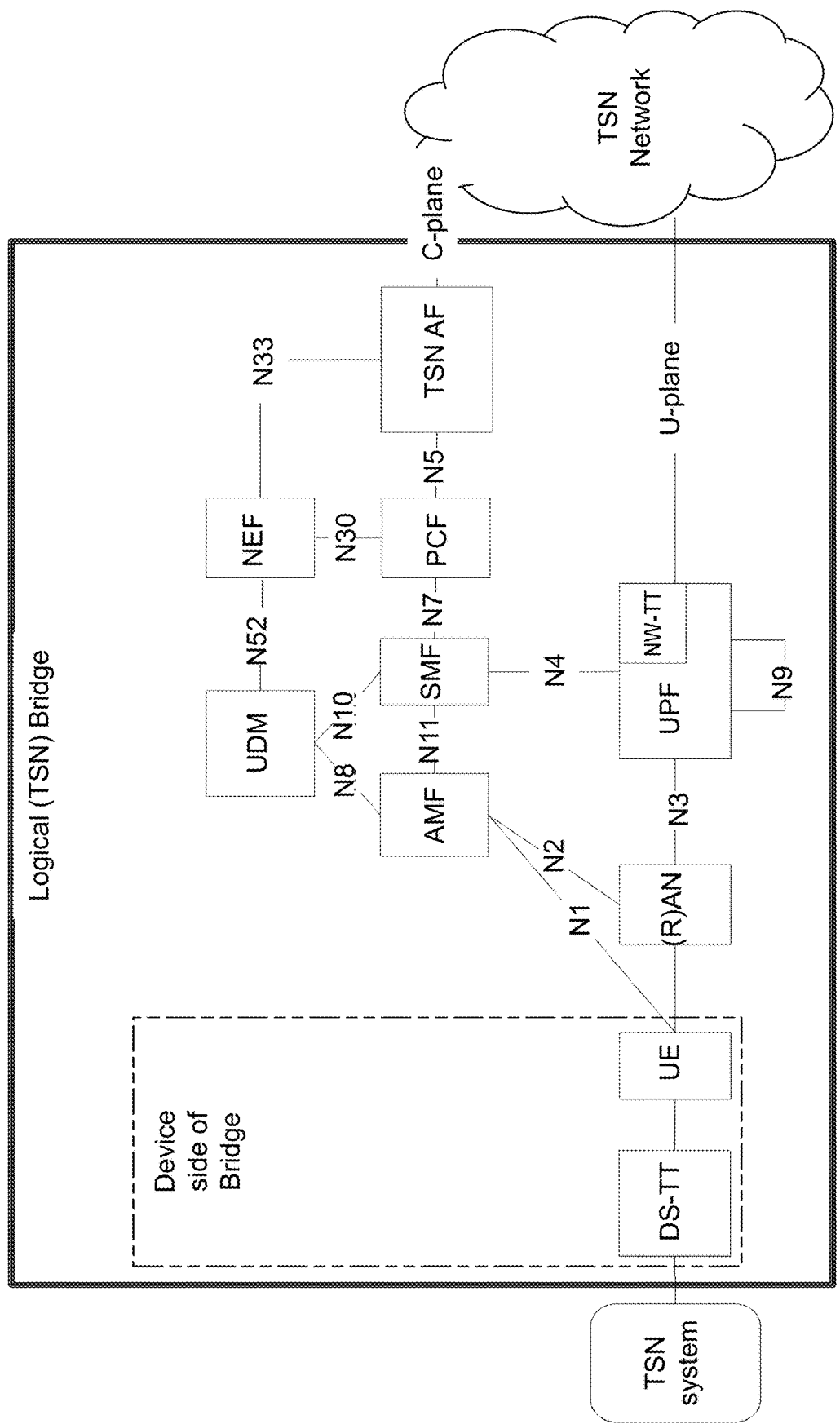
FIG. 3 illustrates the 3GPP 5G-TSN architecture according to 3GPP TS 23.501 v. 16.4.0.
Figure 4:
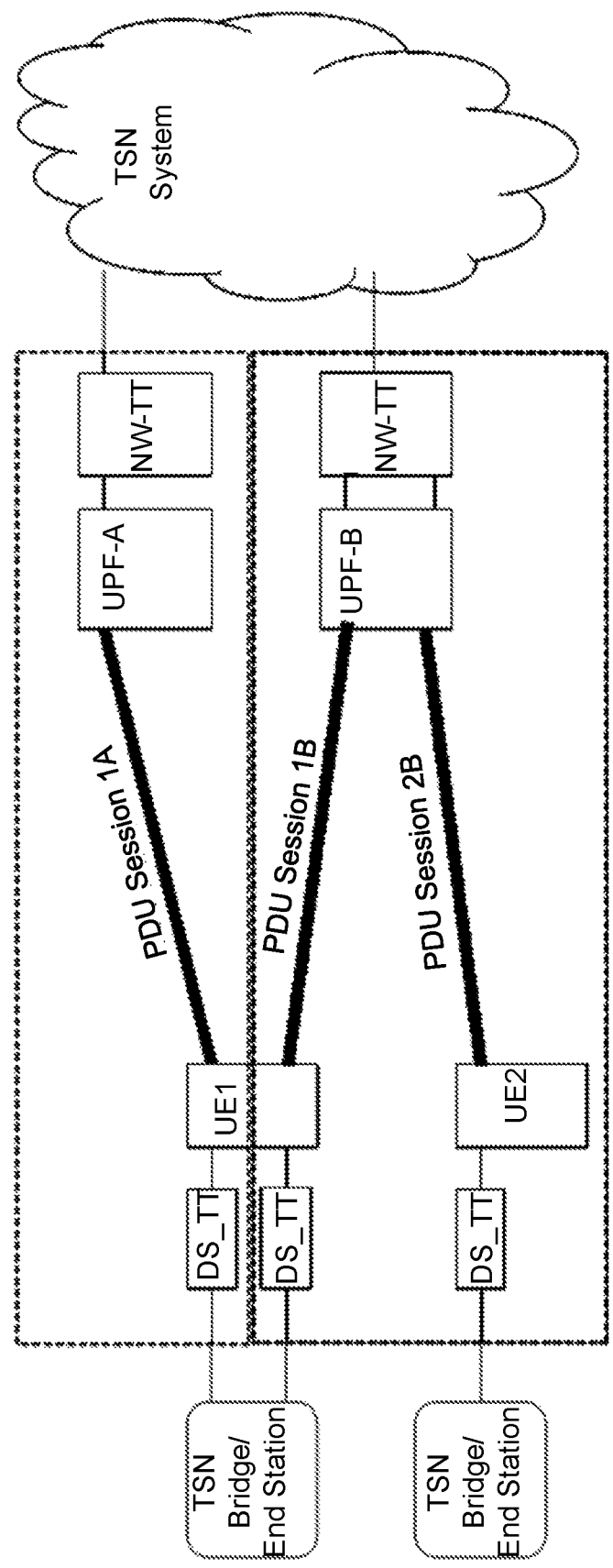
FIG. 4 illustrates 3GPP bridge model from 3GPP TS 23.501, v. 16.4.0.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices. For example, according to certain embodiments, network 106 may include any or all of the components of the 5G core network described above with regard to FIG. 3. Some or all of the components of the 5G core network described above with regard to FIG. 3 may be in addition to or in place of any one or more components of FIG. 14.

Network node 160 and wireless device 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 15:
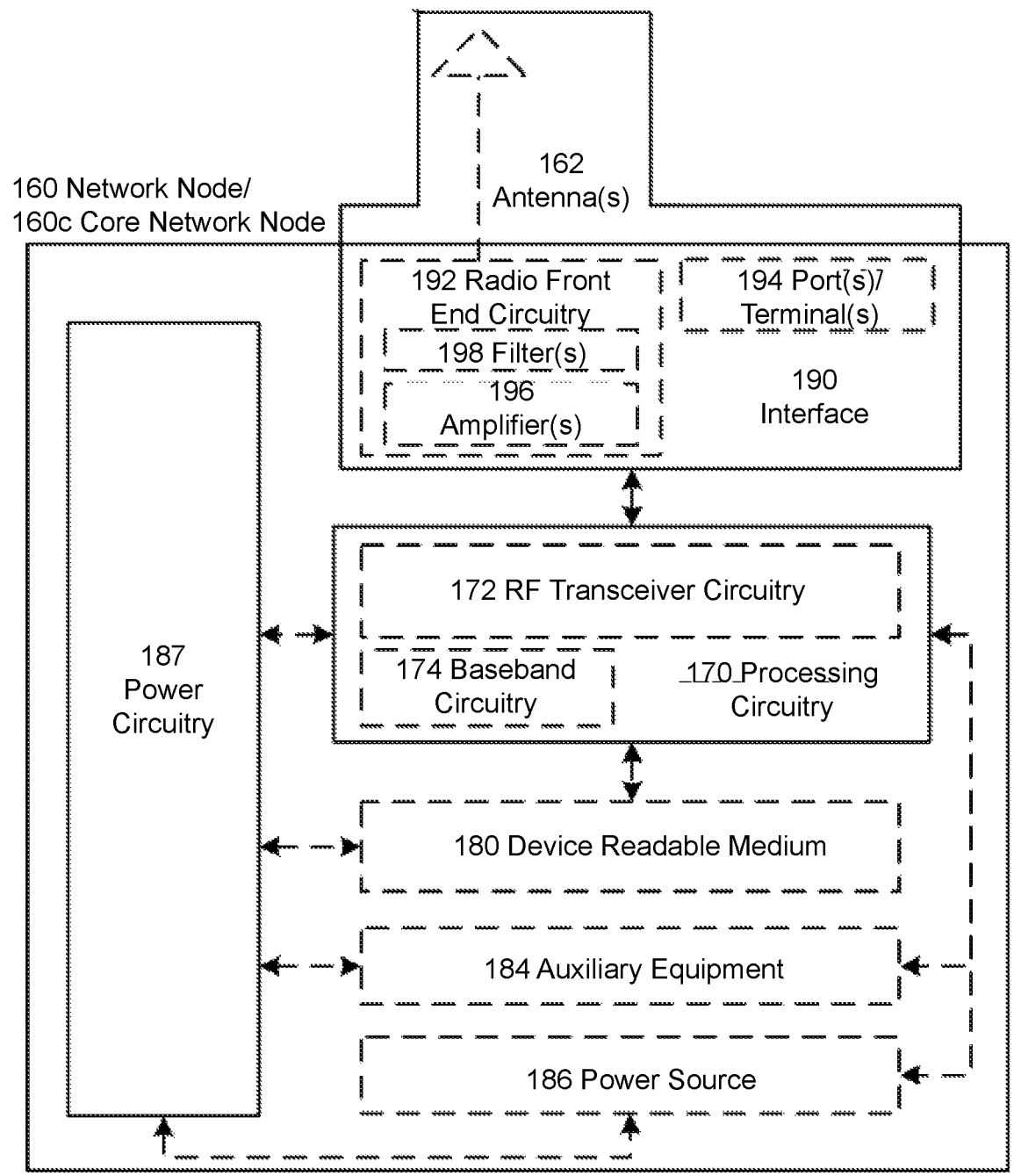
FIG. 15 illustrates an example network node, according to certain embodiments.

FIG. 15 illustrates an example network node 160, 160c, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), OAM nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 15, network node 160 and 160c includes processing circuitry 170, device readable medium 180, interface 190, auxiliary equipment 184, power source 186, power circuitry 187, and antenna 162. Although network node 160 and 160c illustrated in the example wireless network of FIG. 15 may represent a device that includes the illustrated combination of hardware components, other embodiments may comprise network nodes with different combinations of components. For example, in certain embodiments, core network node 160c may not include certain of these features such as antenna(s) 162, radio front end circuitry 192, RF transceiver circuitry 172, and baseband circuitry 174. It is to be understood that a network node comprises any suitable combination of hardware and/or software needed to perform the tasks, features, functions and methods disclosed herein. Moreover, while the components of network node 160 and 160c are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 and 160c may be composed of multiple physically separate components (e.g., a NodeB component and a RNC component, or a BTS component and a BSC component, etc.), which may each have their own respective components. In certain scenarios in which network node 160 and 160c comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 and 160c may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 and 160c may also include multiple sets of the various illustrated components for different wireless technologies integrated into network node 160 and 160c, such as, for example, Global System for Mobile communication (GSM), Wide Code Division Multiplexing Access (WCDMA), Long Term Evolution (LTE), New Radio (NR), WiFi, or Bluetooth wireless technologies. These wireless technologies may be integrated into the same or different chip or set of chips and other components within network node 160 and 160*c*.

In certain embodiments, processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units.

In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160 and 160*c* but are enjoyed by network node 160 and 160*c* as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160 and 160*c*. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or wireless devices 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or wireless devices via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 192 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 and 160c may include additional components beyond those shown in FIG. 15 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

Figure 16:
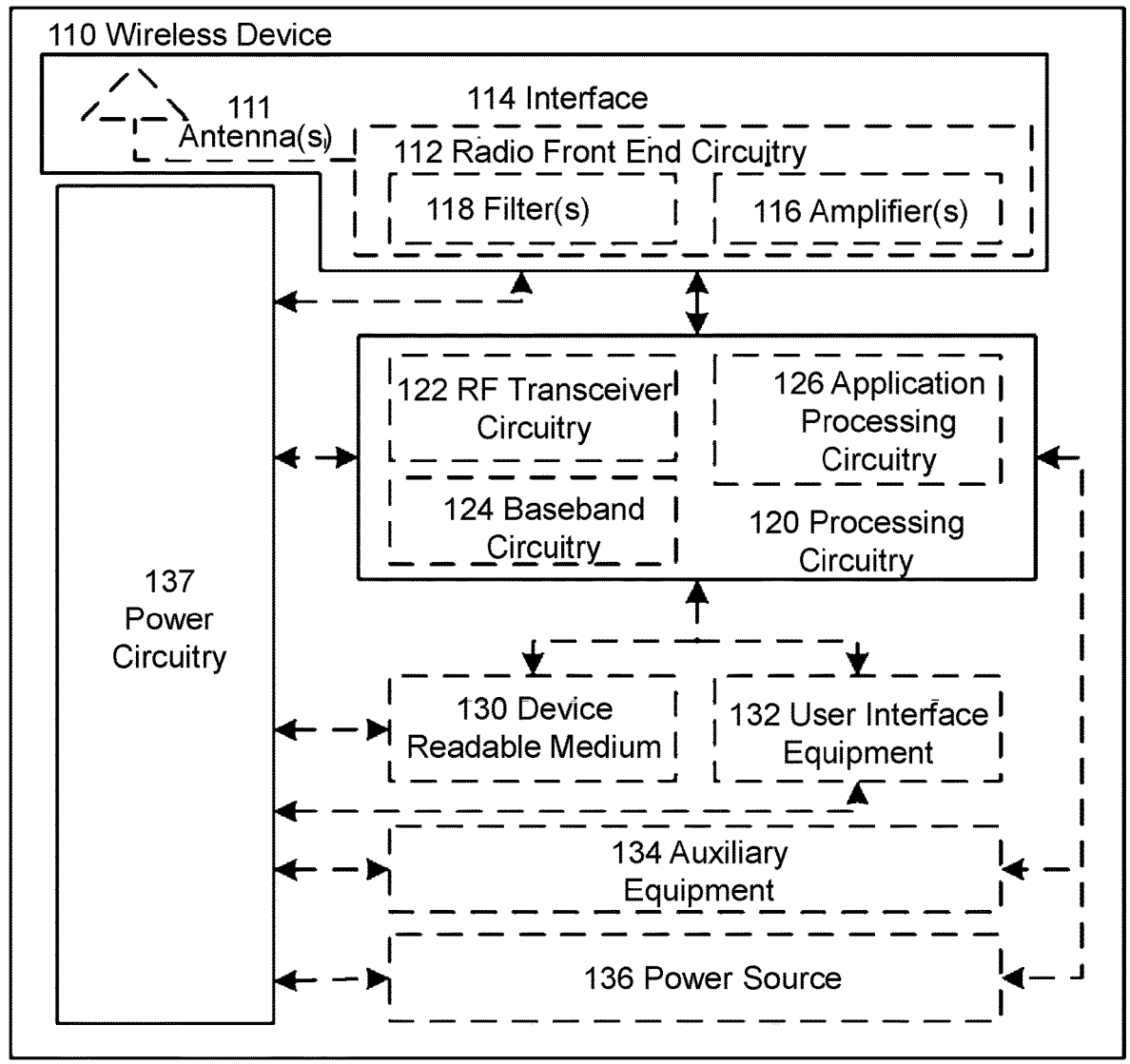
FIG. 16 illustrates an example wireless device, according to certain embodiments.

FIG. 16 illustrates an example wireless device 110. According to certain embodiments. As used herein, wireless device refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A wireless device may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device may represent a machine or other device that performs monitoring and/or measurements and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. Wireless device 110 may include multiple sets of one or more of the illustrated components for different wireless technologies supported by wireless device 110, such as, for example, GSM, WCDMA, LTE, NR, WiFi, WiMAX, or Bluetooth wireless technologies, just to mention a few. These wireless technologies may be integrated into the same or different chips or set of chips as other components within wireless device 110.

Antenna 111 may include one or more antennas or antenna arrays, configured to send and/or receive wireless signals, and is connected to interface 114. In certain alternative embodiments, antenna 111 may be separate from wireless device 110 and be connectable to wireless device 110 through an interface or port. Antenna 111, interface 114, and/or processing circuitry 120 may be configured to perform any receiving or transmitting operations described herein as being performed by a wireless device. Any information, data and/or signals may be received from a network node and/or another wireless device. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 112 is connected to antenna 111 and processing circuitry 120 and is configured to condition signals communicated between antenna 111 and processing circuitry 120. Radio front end circuitry 112 may be coupled to or a part of antenna 111. In some embodiments, wireless device 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or wireless devices via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other wireless device 110 components, such as device readable medium 130, wireless device 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of wireless device 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a wireless device may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of wireless device 110, but are enjoyed by wireless device 110 as a whole, and/or by end users and the wireless network generally.

Processing circuitry 120 may be configured to perform any determining, calculating, or similar operations (e.g., certain obtaining operations) described herein as being performed by a wireless device. These operations, as performed by processing circuitry 120, may include processing information obtained by processing circuitry 120 by, for example, converting the obtained information into other information, comparing the obtained information or converted information to information stored by wireless device 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with wireless device 110. Such interaction may be of many forms, such as visual, audial, tactile, etc. User interface equipment 132 may be operable to produce output to the user and to allow the user to provide input to wireless device 110. The type of interaction may vary depending on the type of user interface equipment 132 installed in wireless device 110. For example, if wireless device 110 is a smart phone, the interaction may be via a touch screen; if wireless device 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into wireless device 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from wireless device 110, and to allow processing circuitry 120 to output information from wireless device 110. User interface equipment 132 may include, for example, a speaker, a display, vibrating circuitry, a USB port, a headphone interface, or other output circuitry. Using one or more input and output interfaces, devices, and circuits, of user interface equipment 132, wireless device 110 may communicate with end users and/or the wireless network and allow them to benefit from the functionality described herein.

Auxiliary equipment 134 is operable to provide more specific functionality which may not be generally performed by wireless devices. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. wireless device 110 may further comprise power circuitry 137 for delivering power from power source 136 to the various parts of wireless device 110 which need power from power source 136 to carry out any functionality described or indicated herein. Power circuitry 137 may in certain embodiments comprise power management circuitry. Power circuitry 137 may additionally or alternatively be operable to receive power from an external power source; in which case wireless device 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of wireless device 110 to which power is supplied.

Figure 17:
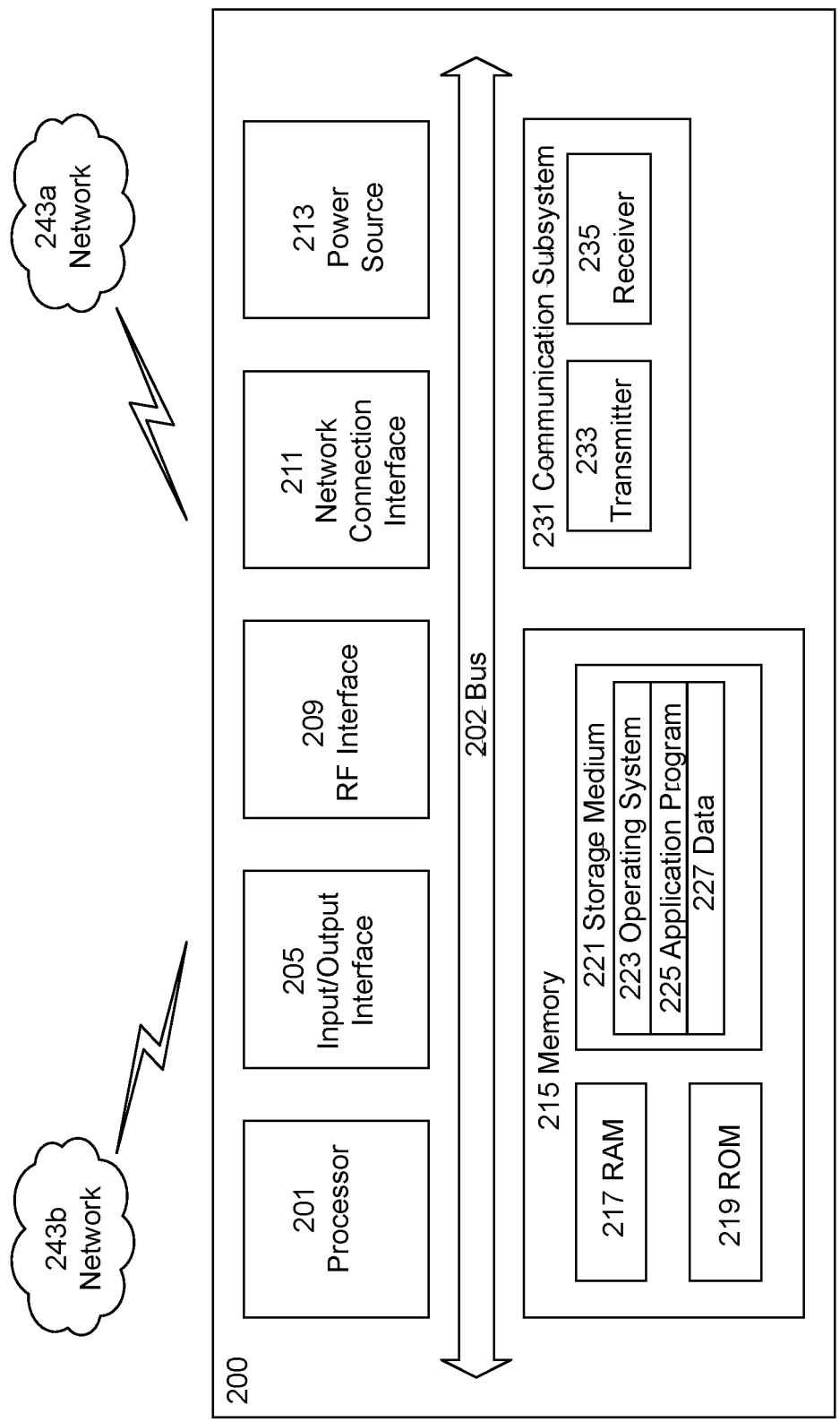
FIG. 17 illustrate an example user equipment, according to certain embodiments.

FIG. 17 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 15, is one example of a wireless device configured for communication in accordance with one or more communication standards promulgated by the $3^{rd}$ Generation Partnership Project (3GPP), such as 3GPP's GSM, UMTS, LTE, and/or 5G standards. As mentioned previously, the term wireless device and UE may be used interchangeable. Accordingly, although FIG. 17 is a UE, the components discussed herein are equally applicable to a wireless device, and vice-versa.

In FIG. 17, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 213, and/or any other component, or any combination thereof. Storage medium 221 includes operating system 223, application program 225, and data 227. In other embodiments, storage medium 221 may include other similar types of information. Certain UEs may utilize all of the components shown in FIG. 17, or only a subset of the components.

The level of integration between the components may vary from one UE to another UE. Further, certain UEs may contain multiple instances of a component, such as multiple processors, memories, transceivers, transmitters, receivers, etc.

In FIG. 17, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 17, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 17, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another wireless device, UE, or base station of a RAN according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 18:
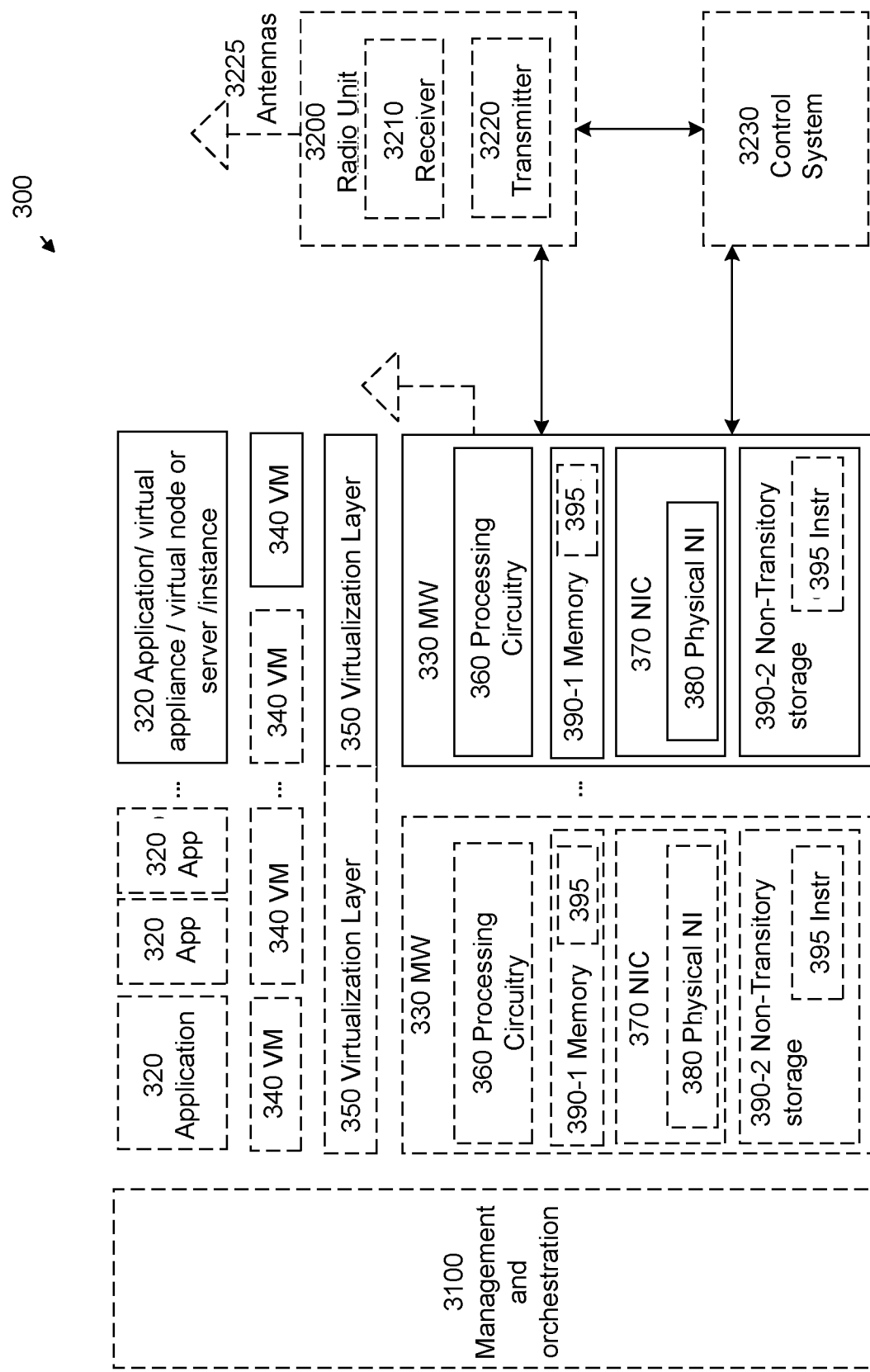
FIG. 18 illustrates a virtualization environment in which functions implemented by some embodiments may be virtualized, according to certain embodiments.

FIG. 18 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks). According to certain embodiments, virtualization environment 300 may be applied to a node such as a core network node.

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 18, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 18.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be affected with the use of control system 3230 which may alternatively be used for communication between the hardware nodes 330 and radio units 3200.

Figure 19:
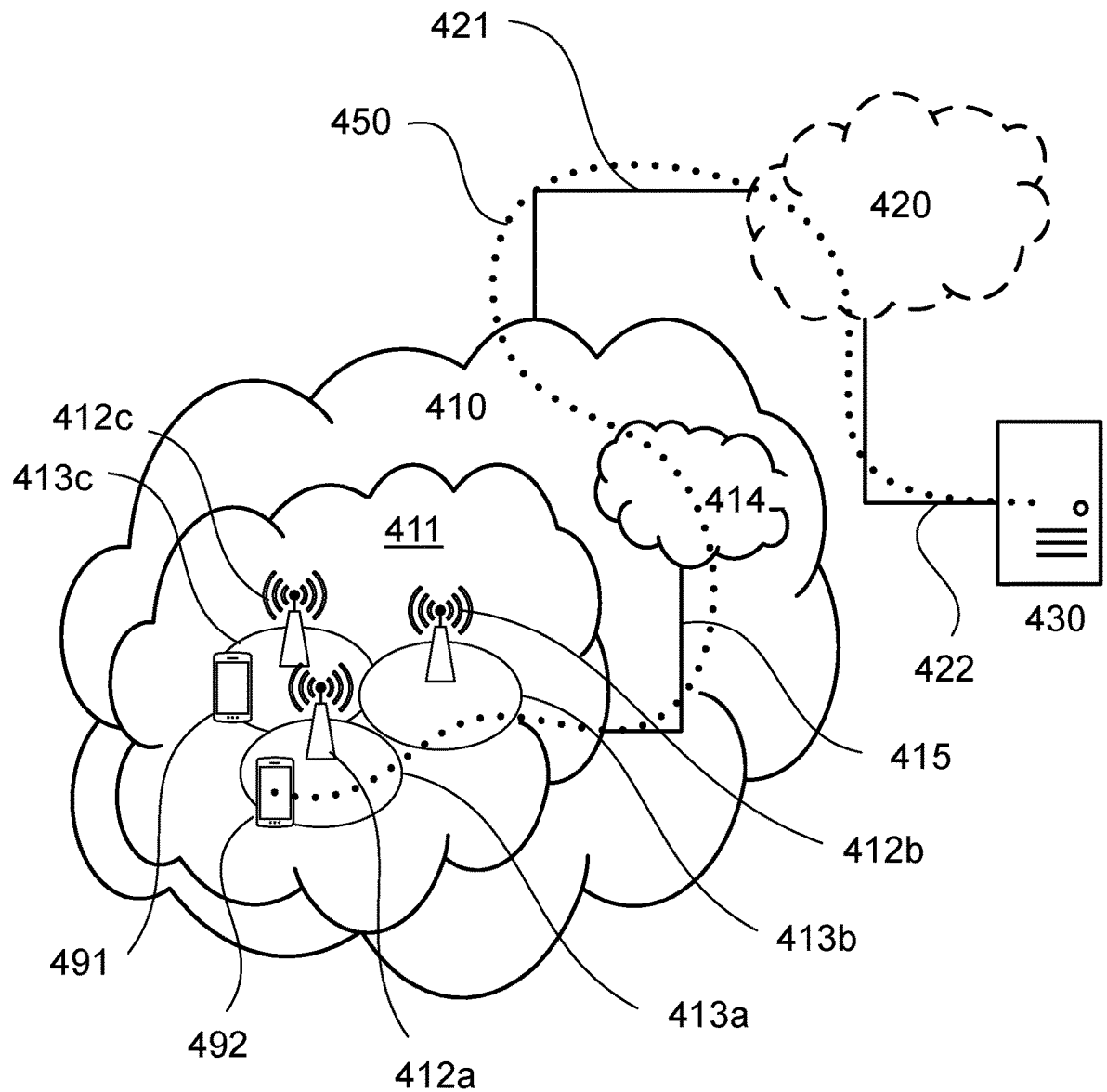
FIG. 19 illustrates a telecommunication network connected via an intermediate network to a host computer, according to certain embodiments.

FIG. 19 illustrates a telecommunication network connected via an intermediate network to a host computer in accordance with some embodiments.

With reference to FIG. 19, in accordance with an embodiment, a communication system includes telecommunication network 410, such as a 3GPP-type cellular network, which comprises access network 411, such as a RAN, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 19 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 20:
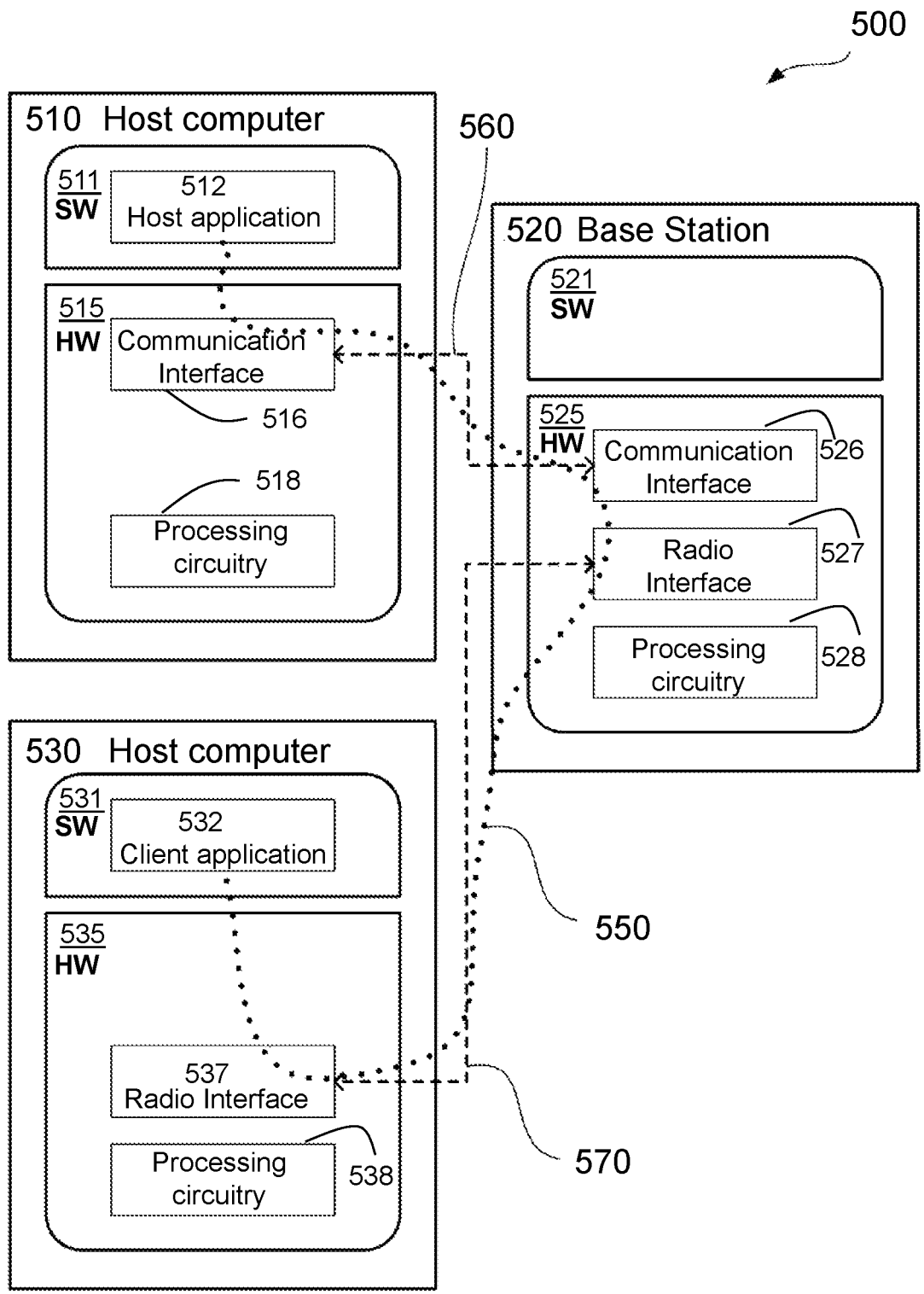
FIG. 20 illustrates a generalized block diagram of a host computer communicating via a base station with a user equipment over a partially wireless connection, according to certain embodiments.

FIG. 20 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 20. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 20) served by base station 520. Communication interface 526 may be configured to facilitate connection 560 to host computer 510. Connection 560 may be direct or it may pass through a core network (not shown in FIG. 20) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 20 may be similar or identical to host computer 430, one of base stations 412*a*, 412*b*, 412*c* and one of UEs 491, 492 of FIG. 19, respectively. This is to say, the inner workings of these entities may be as shown in FIG. 20 and independently, the surrounding network topology may be that of FIG. 19.

In FIG. 20, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the data rate, latency, and/or power consumption and thereby provide benefits such as reduced user waiting time, relaxed restriction on file size, better responsiveness, and/or extended battery lifetime.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figures 21, 22:
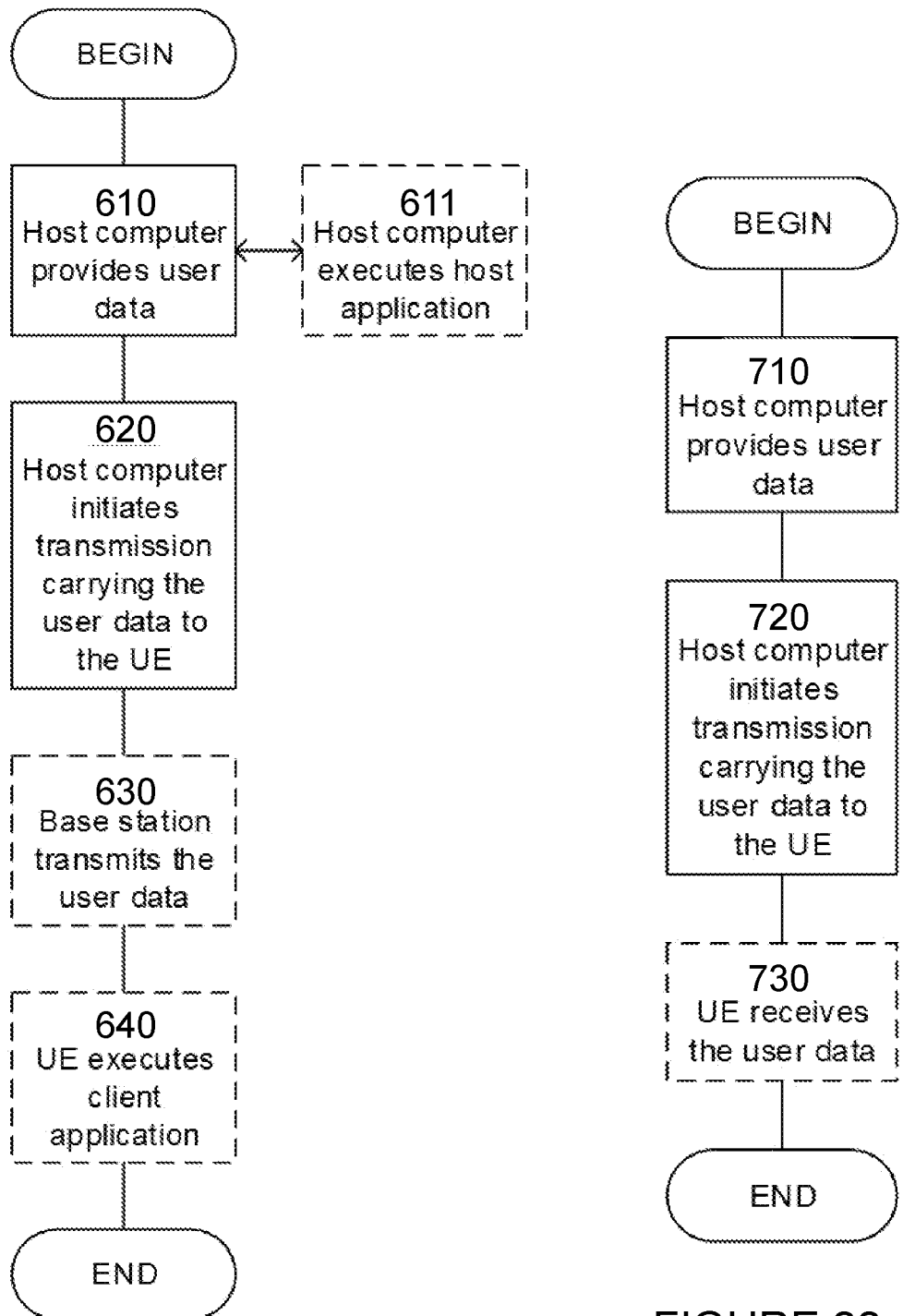
FIG. 21 illustrates a method implemented in a communication system, according to one embodiment.
FIG. 22 illustrates another method implemented in a communication system, according to one embodiment.

FIG. 21 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 21 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

FIG. 22 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 22 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 23:
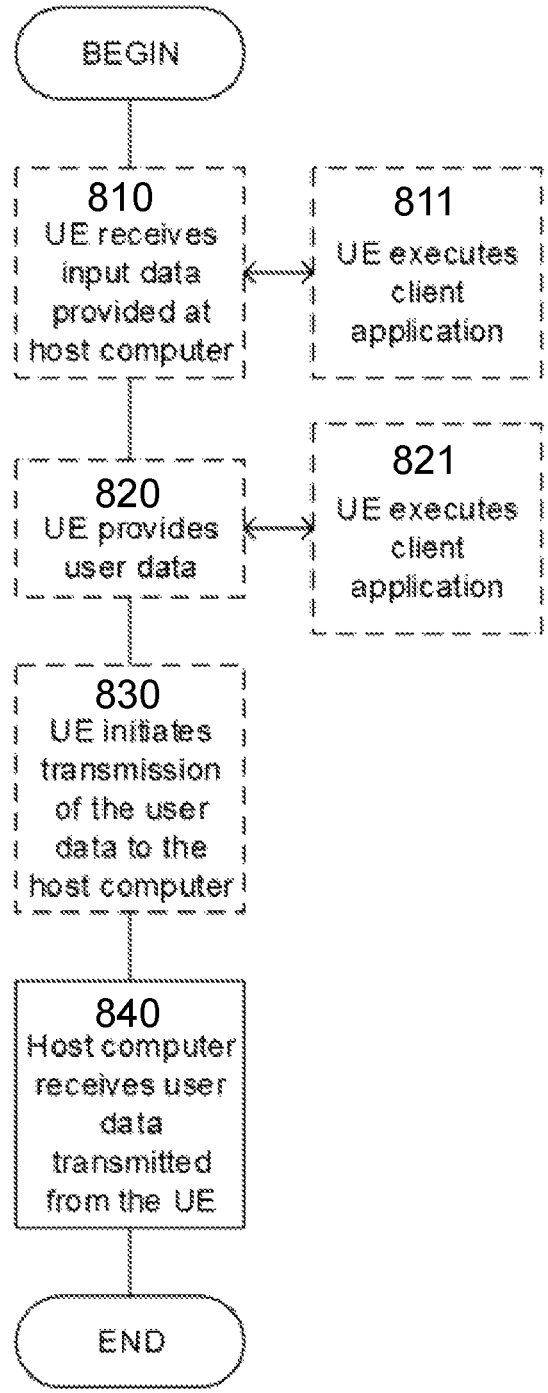
FIG. 23 illustrates another method implemented in a communication system, according to one embodiment.

FIG. 23 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 23 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

Figure 24:
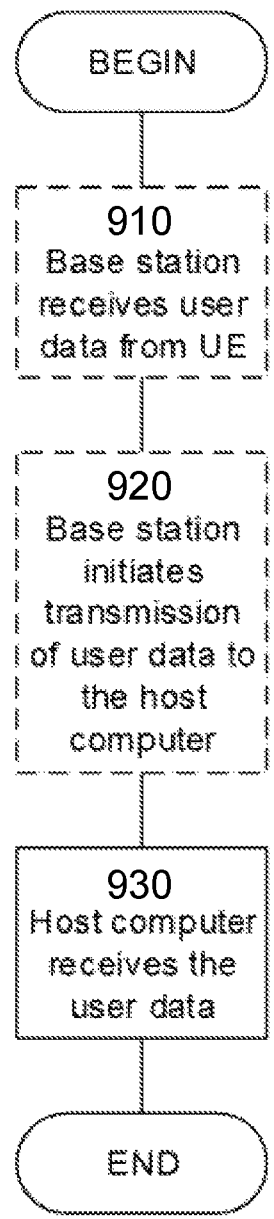
FIG. 24 illustrates another method implemented in a communication system, according to one embodiment.

FIG. 24 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 24 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Figure 25:
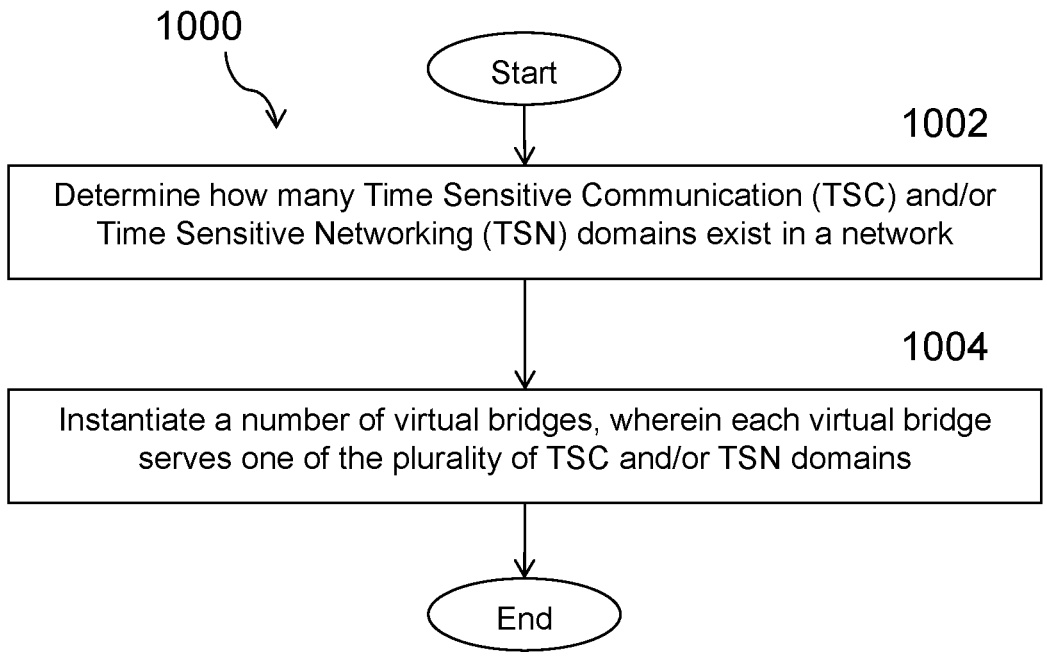
FIG. 25 illustrates an example method by a network node, according to certain embodiments.

FIG. 25 depicts a method 1000 by a network node 160, according to certain embodiments. At step 1002, the network node determines a number of Time Sensitive Communication (TSC) and/or Time Sensitive Networking (TSN) domains 12 that exist in a network. At step 1004, the network node 160 instantiates a number of virtual bridges 14. Each virtual bridge 14 serves a particular one of the number of TSC and/or TSN domains 12.

In a particular embodiment, the network node is a core network node 160*c*.

In a particular embodiment, the core network node 160*c* comprises one or more of an Applications Function (AF), an Operations & Maintenance (OAM), and a $5^{th}$ Generation (5G) exposure Interfaces defined by 5G-ACIA.

In a particular embodiment, determining the number of TSC and/or TSN domains 12 comprises determining a number of core network controllers (CNCs) 16 in the network.

In a particular embodiment, instantiating the number of virtual bridges 12 comprises instantiating a number of network functions 21. Each network function is associated with a TSC and/or TSN domain 12 and/or a virtual bridge 14.

In a particular embodiment, determining the number of TSC and/or TSN domains comprises receiving information from a non-3GPP network controller such as, for example, a CNC 16.

In a particular embodiment, the information comprises network topology information, a geographical location of a 5G system (5GS) port 17, VLAN information, a DNN, and S-NSSAI.

In a particular embodiment, for each TSC and/or TSN domain 12, a different core network controller 16 manages one or more of the number of virtual bridges 14.

In a particular embodiment, the number of TSC and/or TSN domains 12 comprises a plurality of TSC and/or TSN domains, and instantiating the number of virtual bridges 14 comprises: determining how many ports 17 and user plane function(s) 18 are needed for a particular one of the plurality of TSC and/or TSN domains 12; and instantiating the user plane function(s) 18.

In a particular embodiment, at least one virtual bridge 14 is part of a higher TSC and/or TSN domain 12.

In a particular embodiment, using a first CNC 16 that is higher in hierarchy to provide communication between at least two other CNCs 16 that are lower in a hierarchy than the first CNC 16.

In a particular embodiment, at least one virtual bridge 61, 71 acts as a TSC and/or TSN domain of its own.

In a particular embodiment, at least one TSC and/or TSN domain 71 provides connectivity and/or transport services for other TSC and/or TSN domains 12.

In a particular embodiment, at least one TSC and/or TSN domain 71 provides connectivity and/or transport services between at least two local production domains 12.

In a particular embodiment, a different CNC 16 configures each group of port pairs of a virtual bridge 14.

In a particular embodiment, each virtual bridge 14 is managed by a different CNC 16.

In a particular embodiment, a first CNC 16 that is higher in a hierarchy configures at least one TSC and/or TSN stream path 62 between the number of TSC and/or TSN domains 12 located lower in the hierarchy.

Figure 26:
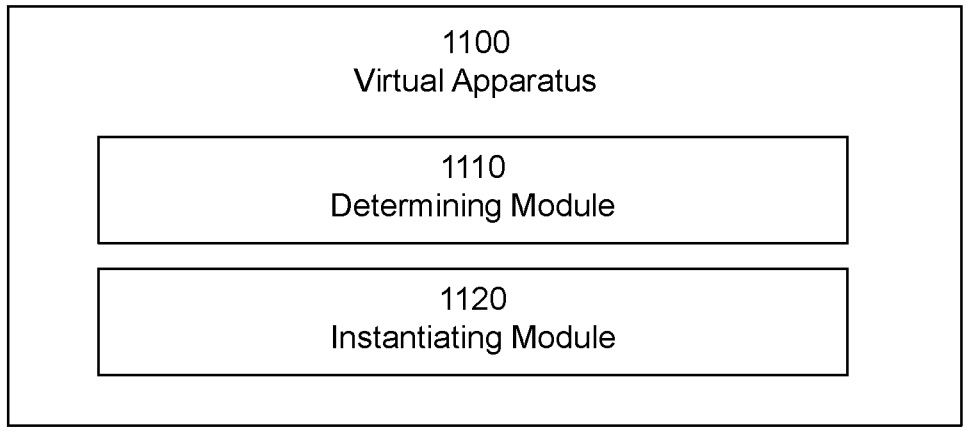
FIG. 26 illustrates an exemplary virtual computing device, according to certain embodiments.

FIG. 26 illustrates a schematic block diagram of a virtual apparatus 1100 in a wireless network (for example, the wireless network shown in FIG. 14). The apparatus may be implemented in a wireless device or network node (e.g., wireless device 110 or network node 160 shown in FIG. 14). Apparatus 1100 is operable to carry out the example method described with reference to FIG. 25 and possibly any other processes or methods disclosed herein. It is also to be understood that the method of FIG. 25 is not necessarily carried out solely by apparatus 1100. At least some operations of the method can be performed by one or more other entities.

Virtual Apparatus 1100 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause determining module 1110, instantiating module 1120, and any other suitable units of apparatus 1100 to perform corresponding functions according one or more embodiments of the present disclosure.

According to certain embodiments, determining module 1110 may perform certain of the determining functions of the apparatus 1100. For example, determining module 1110 may determine a number of Time Sensitive Communication (TSC) and/or Time Sensitive Networking (TSN) domains 12 that exist in a network.

According to certain embodiments, instantiating module 1120 may perform certain of the instantiating functions of the apparatus 1100. For example, instantiating module 1120 may instantiate a number of virtual bridges 14. Each virtual bridge 14 serves a particular one of the number of TSC and/or TSN domains 12.

As used herein, the term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 27:
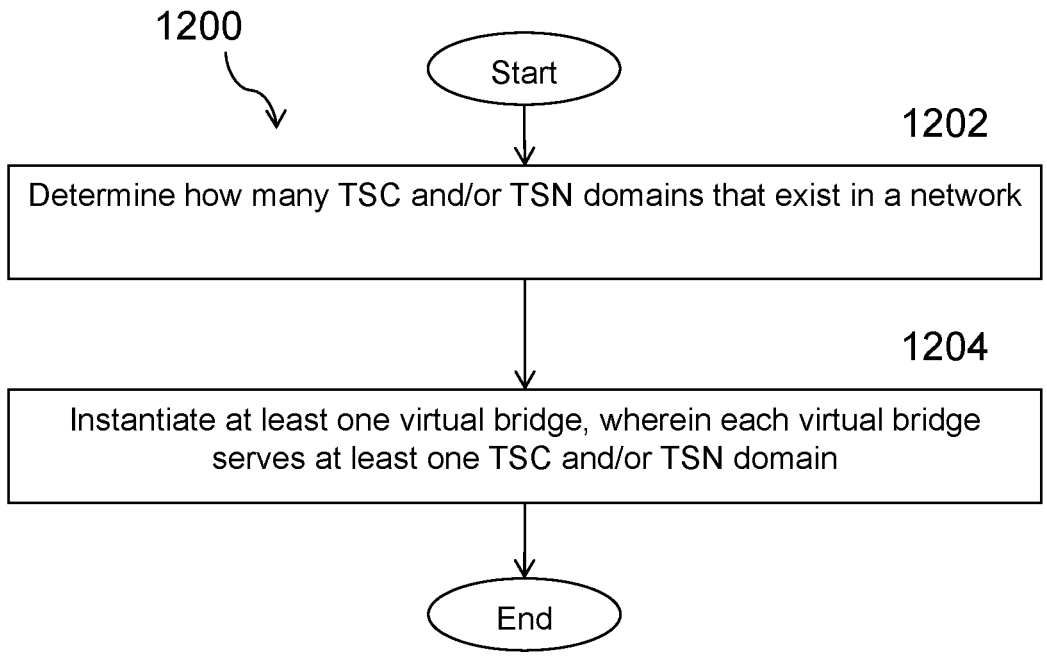
FIG. 27 illustrates another example method by a network node, according to certain embodiments.

FIG. 27 depicts a method 1200 by a network node 160, according to certain embodiments. At step 1202, the network node 160c determines how many TSC and/or TSN, domains that exist in a network, wherein the network comprises a plurality of TSC and/or TSN domains. At step 1204, the network node 160c instantiates at least one virtual bridge 14 wherein each virtual bridge serves at least one TSC and/or TSN domain 12. In some embodiments, the network node 160c instantiates at least one virtual bridge 14 for each one of the plurality of TSC domains 12.

In a particular embodiment, the network node is a core network node 160c.

In a further particular embodiment, the core network node 160c includes at least one of an AF 21, an OAM, and a network exposure Interface.

In a particular embodiment, determining how many TSC and/or TSN domains that exist comprises determining how many CNC controllers that exist in the network.

In a particular embodiment, instantiating at least one virtual bridge 14 comprises instantiating at least one network function 21, and each network function is associated with at least one TSC and/or TSN domain, or with at least one virtual bridge.

In a particular embodiment, determining how many TSC and/or TSN domains that exist comprises receiving information from a non-3GPP network controller. In a further particular embodiment, the non-3GPP network controller comprises a CNC controller 16. In a still further particular embodiment, the non-3GPP network controller comprises a SDN controller.

In a further particular embodiment, the received information comprises network topology information; a geographical location of a 5G system, 5GS, port; VLAN information; a DNN; and/or S-NSSAI.

In a particular embodiment, the instantiating of at least one virtual bridge is performed in dependence of how many TSC and/or TSN domains that exist in the network.

In a particular embodiment, for each TSC domain, a different CNC controller manages at least one bridge, the bridge being virtual or fixed.

In a particular embodiment, instantiating at least one virtual bridge includes determining how many ports 17 and user plane function(s) 18 are needed for a particular one of the plurality of TSC and/or TSN domains and instantiating a number of user plane function(s) in dependence of how many user plane function(s) are needed.

In a particular embodiment, at least one virtual bridge is part of a higher TSC and/or TSN domain, and the network node 160c uses a first CNC controller that is higher in a hierarchy to provide communication between at least two other central network configuration controllers that are lower in a hierarchy than the first central network configuration controller.

In a particular embodiment, at least one virtual bridge acts as a TSC and/or TSN domain 71. In a further particular embodiment, the at least one virtual bridge acting as a TSC/TSN domain provides connectivity and/or transport services for at least one other TSC/TSN domain; and/or the at least one virtual bridge acting TSC/TSN domain provides connectivity and/or transport services between at least two local production domains.

Figure 28:
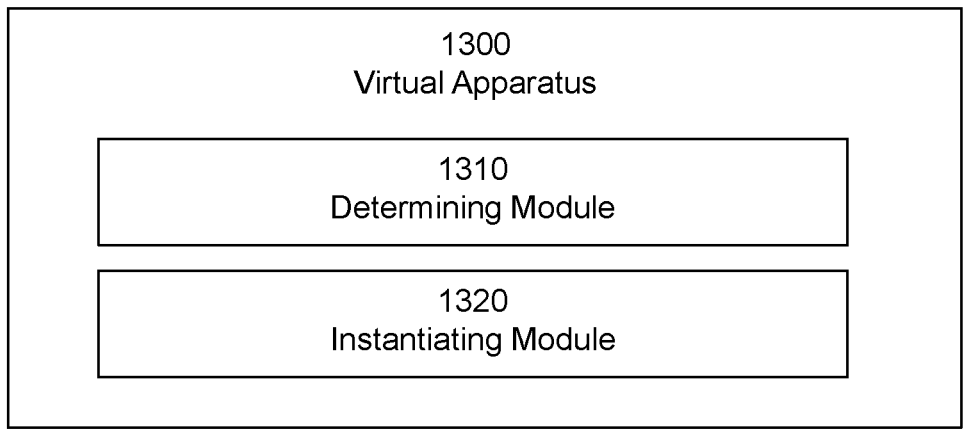
FIG. 28 illustrates another exemplary virtual computing device, according to certain embodiments.

FIG. 28 illustrates a schematic block diagram of a virtual apparatus 1300 in a wireless network (for example, the wireless network shown in FIG. 14). The apparatus may be implemented in a wireless device or network node (e.g., wireless device 110 or network node 160 shown in FIG. 14). Apparatus 1300 is operable to carry out the example method described with reference to FIG. 27 and possibly any other processes or methods disclosed herein. It is also to be understood that the method of FIG. 27 is not necessarily carried out solely by apparatus 1300. At least some operations of the method can be performed by one or more other entities.

Virtual Apparatus 1300 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause determining module 1310, instantiating module 1320, and any other suitable units of apparatus 1300 to perform corresponding functions according one or more embodiments of the present disclosure.

According to certain embodiments, determining module 1310 may perform certain of the determining functions of the apparatus 1300. For example, determining module 1310 may determine how many TSC and/or TSN domains 12 that exist in a network.

According to certain embodiments, instantiating module 1320 may perform certain of the instantiating functions of the apparatus 1300. For example, instantiating module 1320 may instantiate at least one virtual bridge 14, wherein each virtual bridge 14 serves at least one TSC and/or TSN domain 12.

Figure 29:
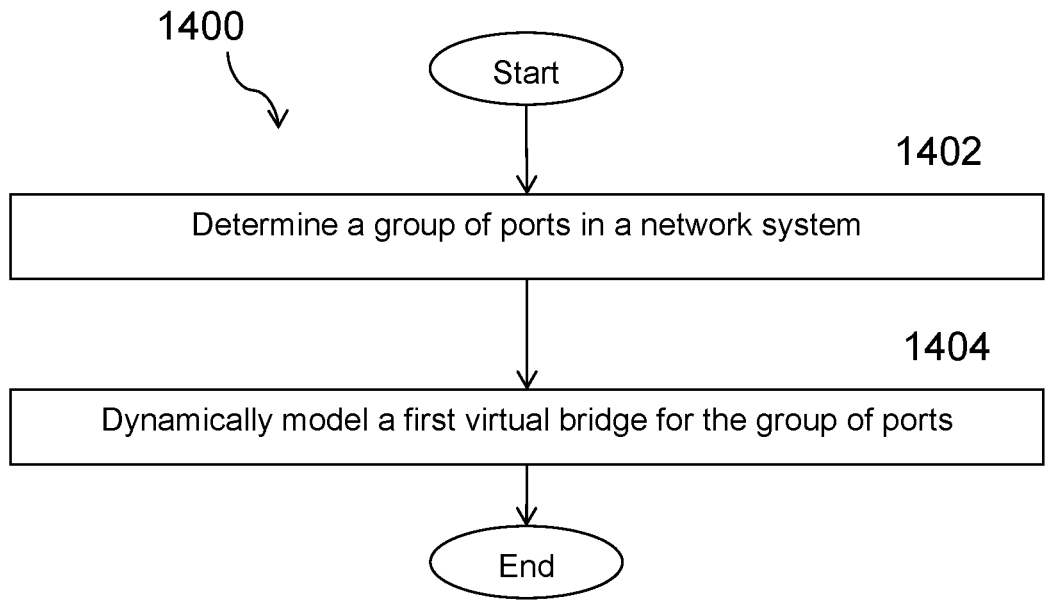
FIG. 29 illustrates another example method by a network node, according to certain embodiments.

FIG. 29 depicts a method 1400 by a network node 160, according to certain embodiments. The network node 160 may include a core network node 160c, in certain embodiments. At step 1402, the network node 160, 160c determines a group of ports 17 in a network system. At step 1404, the network node dynamically models a first virtual bridge 14 for the group of ports 17. In a particular embodiment, the group of ports are associated with a first TSC/TSN domain.

In a particular embodiment, the first virtual bridge is managed by a CNC controller associated with a first TSC domain.

In a particular embodiment, the first virtual bridge is associated with the first TSC domain and the first TSC domain is serving a UE. When the UE moves to a second TSC domain, the network node dynamically models a second virtual bridge associated with the second TSC domain.

In a particular embodiment, the group of ports 17 comprise at least one ingress port.

In a particular embodiment, the group of ports 17 comprise at least one egress port.

In a particular embodiment, the group of ports 17 comprise at least one UPF port.

In a particular embodiment, the group of ports 17 comprises at least one user equipment (UE) port.

In a particular embodiment, the method further includes associating the group of ports 17 with a bridge identifier.

In a particular embodiment, the method further includes reporting the bridge identifier to a network function such as an application function 21 or a 3GPP network node dedicated to the virtual bridge 14.

In a particular embodiment, the network includes a plurality of virtual bridges 14 and each virtual bridge 14 is managed by a dedicated CNC 16 from different TSC and/or TSN domains 12.

In a particular embodiment, the virtual bridge 14 is associated with a first TSC and/or TSN domain 12 serving a user equipment (UE) 110, and wherein when the UE 110 moves to a second TSC and/or TSN domain 12, the UE 110 is modelled to another virtual bridge 14 associated with the second TSC and/or TSN domain 12.

Figure 30:
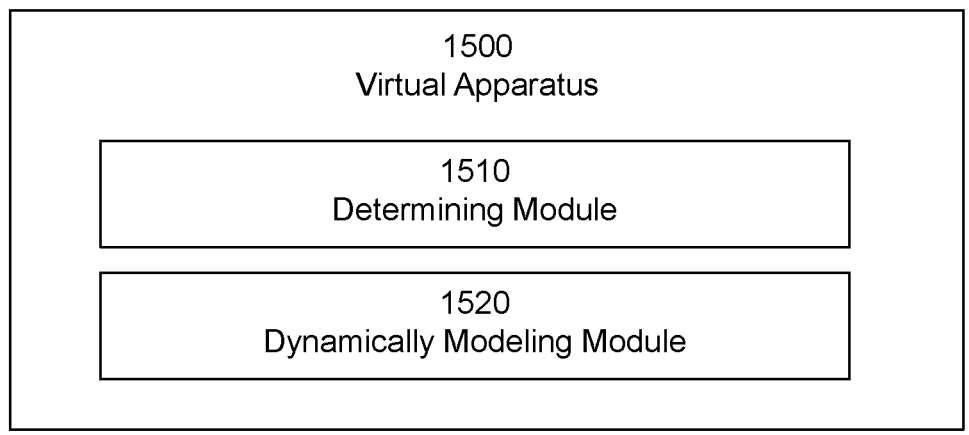
FIG. 30 illustrates another exemplary virtual computing device, according to certain embodiments.

FIG. 30 illustrates a schematic block diagram of a virtual apparatus 1500 in a wireless network (for example, the wireless network shown in FIG. 14). The apparatus may be implemented in a wireless device or network node (e.g., wireless device 110 or network node 160 or 160c shown in FIG. 14). Apparatus 1500 is operable to carry out the example method described with reference to FIG. 29 and possibly any other processes or methods disclosed herein. It is also to be understood that the method of FIG. 29 is not necessarily carried out solely by apparatus 1500. At least some operations of the method can be performed by one or more other entities.

Virtual Apparatus 1500 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause determining module 1510, dynamically modeling module 1520, and any other suitable units of apparatus 1500 to perform corresponding functions according one or more embodiments of the present disclosure.

According to certain embodiments, determining module 1510 may perform certain of the determining functions of the apparatus 1500. For example, determining module 1110 may determine a group of ports 17 in a network system.

According to certain embodiments, dynamically modeling module 1520 may perform certain of the instantiating functions of the apparatus 1500. For example, instantiating module 1520 may dynamically model a virtual bridge 14 for the group of ports 17.

EXAMPLE EMBODIMENTS

Example Embodiment 1. A method performed by a network node, the method comprising: determining a number of Time Sensitive Communication (TSC) and/or Time Sensitive Networking (TSN) domains that exist in a network; and instantiating a number of virtual bridges, wherein each virtual bridge serves a particular one of the number of TSC and/or TSN domains.

Example Embodiment 2. The method of Example Embodiment 1, wherein the network node is a core network node.

Example Embodiment 3. The method of any one of Example Embodiments 1 to 2, wherein the core network node comprises one or more of an Applications Function (AF), an Operations & Maintenance (OAM), and a $5^{th}$ Generation (5G) exposure Interfaces defined by 5G-ACIA.

Example Embodiment 4. The method of any one of Example Embodiments 1 to 3, wherein determining the number of TSC and/or TSN domains comprises determining a number of CNCs in the network.

Example Embodiment 5. The method of any one of Example Embodiments 1 to 4, wherein instantiating the number of virtual bridges comprises instantiating a number of network functions, each network function associated with a TSC and/or TSN domain and/or a virtual bridge.

Example Embodiment 6. The method of any one of Example Embodiments 1 to 5, wherein determining the number of TSC and/or TSN domains comprises receiving information from a non-3GPP network controller such as, for example, a CNC.

Example Embodiment 7. The method of Example Embodiment 6, wherein the information comprises network topology information, a geographical location of a 5G system (5GS) port, virtual local area network (VLAN) information, a Data Network Name (DNN), and Single-Network Slice Selection Assistance Information (S-NSSAI).

Example Embodiment 8. The method of any one of Example Embodiments 1 to 7, wherein, for each TSC and/or TSN domain, a different CNC controller manages one or more of the number of virtual bridges.

Example Embodiment 9. The method of any one of Example Embodiments 1 to 8, wherein: the number of TSC and/or TSN domains comprises a plurality of TSC and/or TSN domains, and instantiating the number of virtual bridges comprises: determining how many ports and user plane function(s) are needed for a particular one of the plurality of TSC and/or TSN domains; and instantiating the user plane function(s).

Example Embodiment 10. The method of any one of Example Embodiments 1 to 9 wherein at least one virtual bridge is part of a higher TSC and/or TSN domain.

Example Embodiment 11. The method of Example Embodiment 10, further comprising using a first CNC that is higher in a hierarchy to provide communication between at least two other CNCs that are lower in a hierarchy than the first CNC.

Example Embodiment 11. The method of any one of Example Embodiments 1 to 9, wherein at least one virtual bridge acts as a TSC and/or TSN domain of its own, wherein the virtual bridge can for example be a 5G virtual bridge.

Example Embodiment 12. The method of Example Embodiment 11, wherein at least one TSC and/or TSN domain provides connectivity and/or transport services for other TSC and/or TSN domains.

Example Embodiment 13. The method of Example Embodiment 11, wherein at least one TSC and/or TSN domain provides connectivity and/or transport services between at least two local production domains.

Example Embodiment 14. The method of any one of Example Embodiments 1 to 13, wherein a different CNC configures each group of port pairs of a virtual bridge.

Example Embodiment 15. The method of any one of Example Embodiments 1 to 13, wherein each virtual bridge is managed by a different CNC.

Example Embodiment 16. The method of any one of Example Embodiments 1 to 15, wherein a first CNC that is higher in a hierarchy configures at least one TSC and/or TSN stream path between the number of TSC and/or TSN domains located lower in the hierarchy.

Example Embodiment 17. A network node comprising processing circuitry configured to perform any of the methods of Example Embodiments 1 to 16.

Example Embodiment 18. A computer program comprising instructions which when executed on a computer perform any of the methods of Example Embodiments 1 to 16.

Example Embodiment 19. A computer program product comprising computer program, the computer program comprising instructions which when executed on a computer perform any of the methods of Example Embodiments 1 to 16.

Example Embodiment 20. A non-transitory computer readable medium storing instructions which when executed by a computer perform any of the methods of Example Embodiments 1 to 16.

Example Embodiment 21. A method performed by a network node, the method comprising: determining a group of ports in a network system; and dynamically modeling a virtual bridge for the group of ports.

Example Embodiment 22. The method of Example Embodiment 21, wherein the group of ports comprise at least one ingress port.

Example Embodiment 23. The method of any one of Example Embodiments 21 to 22, wherein the group of ports comprise at least one egress port.

Example Embodiment 24. The method of any one of Example Embodiments 21 to 23, wherein the group of ports comprise at least one UPF port.

Example Embodiment 25. The method of any one of Example Embodiments 21 to 24, wherein the group of ports comprises at least one user equipment (UE) port.

Example Embodiment 26. The method of any one of Example Embodiments 21 to 25, further comprising associating the group of ports with a bridge identifier.

Example Embodiment 27. The method of Example Embodiment 26, further comprising reporting the bridge identifier to a network function such as an application function or a 3GPP network node dedicated to the virtual bridge.

Example Embodiment 28. The method of any one of Example Embodiments 21 to 27, wherein the network includes a plurality of virtual bridges and each virtual bridge is managed by a dedicated CNC from different TSC and/or TSN domains.

Example Embodiment 29. The method of any one of Example Embodiments 21 to 28, wherein the virtual bridge is associated with a first TSC and/or TSN domain serving a user equipment (UE), and wherein when the UE moves to a second TSC and/or TSN domain the UE is modelled to another virtual bridge associated with the second TSC and/or TSN domain.

Example Embodiment 30. A network node comprising processing circuitry configured to perform any of the methods of Example Embodiments 21 to 29.

Example Embodiment 31. A computer program comprising instructions which when executed on a computer perform any of the methods of Example Embodiments 21 to 29.

Example Embodiment 32. A computer program product comprising computer program, the computer program comprising instructions which when executed on a computer perform any of the methods of Example Embodiments 21 to 29.

Example Embodiment 33. A non-transitory computer readable medium storing instructions which when executed by a computer perform any of the methods of Example Embodiments 21 to 29.

Example Embodiment 34. A network node comprising: processing circuitry configured to perform any of the steps of any of Example Embodiments 1 to 33; power supply circuitry configured to supply power to the wireless device.

Example Embodiment 35. A communication system including a host computer comprising: processing circuitry configured to provide user data; and a communication interface configured to forward the user data to a cellular network for transmission to a wireless device, wherein the cellular network comprises a network node having a radio interface and processing circuitry, the network node's processing circuitry configured to perform any of the steps of any of Example Embodiments 1 to 33.

Example Embodiment 36. The communication system of the previous embodiment further including the network node.

Example Embodiment 37. The communication system of the previous 2 Example Embodiments, further including the wireless device, wherein the wireless device is configured to communicate with the network node.

Example Embodiment 38. The communication system of the previous 3 Example Embodiments, wherein: the processing circuitry of the host computer is configured to execute a host application, thereby providing the user data; and the wireless device comprises processing circuitry configured to execute a client application associated with the host application.

Example Embodiment 39. A method implemented in a communication system including a host computer, a network node and a wireless device, the method comprising: at the host computer, providing user data; and at the host computer, initiating a transmission carrying the user data to the wireless device via a cellular network comprising the network node, wherein the network node performs any of the steps of any of Example Embodiments 1 to 33.

Example Embodiment 40. The method of the previous Example Embodiment, further comprising, at the network node, transmitting the user data.

Example Embodiment 41. The method of the previous 2 Example Embodiments, wherein the user data is provided at the host computer by executing a host application, the method further comprising, at the wireless device, executing a client application associated with the host application.

Example Embodiment 42. A wireless device configured to communicate with a network node, the wireless device comprising a radio interface and processing circuitry configured to performs the of the previous 3 Example Embodiments.

Example Embodiment 43. A communication system including a host computer comprising a communication interface configured to receive user data originating from a transmission from a wireless device to a network node, wherein the network node comprises a radio interface and processing circuitry, the network node's processing circuitry configured to perform any of the steps of any of Example Embodiments 1 to 33.

Example Embodiment 44. The communication system of the previous Example Embodiment further including the network node.

Example Embodiment 45. The communication system of the previous 2 Example Embodiments, further including the wireless device, wherein the wireless device is configured to communicate with the network node.

Example Embodiment 46. The communication system of the previous 3 Example Embodiments, wherein: the processing circuitry of the host computer is configured to execute a host application; the wireless device is configured to execute a client application associated with the host application, thereby providing the user data to be received by the host computer.

Example Embodiment 47. The method of any of the previous Example Embodiments, wherein the network node comprises a base station.

Example Embodiment 48. The method of any of the previous Example Embodiments, wherein the wireless device comprises a user equipment (UE).

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. For example, the disclosure has been made in terms of virtual bridges which are modelled by use of a 5GS. However, virtual bridges according to the disclosure could be implemented by use of other wireless systems, such as 6G systems which are currently being developed. Accordingly, the above description of the embodiments does not constrain this disclosure. Other changes, substitutions, and alterations are possible without departing from the spirit and scope of this disclosure.

The invention claimed is:

1. A method performed by a network node, the method comprising:
determining how many Time Sensitive Communication, TSC, and/or Time Sensitive Networking, TSN, domains exist in a network system comprising a plurality of TSC and/or TSN domains, wherein determining how may TSC and TSN domains exist in the network system comprises at least one of:
determining how many central network configuration, CNC, controllers that exist in the network; and
receiving information from a non-3GPP network controller; and
instantiating at least one virtual bridge, wherein each virtual bridge serves at least one TSC and/or TSN domain and wherein instantiating at least one virtual bridge comprises:
determining how many ports and user plane function(s) that are needed for a particular one of the plurality of TSC and/or TSN domains; and
instantiating a number of user plane function(s) in dependence of how many user plane function(s) are needed.

2. The method of claim 1, wherein the network node is a core network node and the core network node comprises at least one of:
an Applications Function, AF,
an Operations & Maintenance, OAM, and
a network exposure Interface.

3. The method of claim 1, wherein instantiating at least one virtual bridge comprises instantiating at least one network function, each network function associated with at least one TSC and/or TSN domain or at least one virtual bridge.

4. The method of claim 1, wherein determining how many TSC and/or TSN domains that exist comprises receiving information from a non-3GPP network controller.

5. The method of claim 4, wherein the non-3GPP network controller comprises a central network configuration, CNC, controller or a Software-Defined Networking, SDN, controller.

6. The method of claim 4, wherein the information comprises
network topology information;
a geographical location of a 5G system, 5GS, port;
virtual local area network, VLAN, information; a Data Network Name, DNN; and/or
Single-Network Slice Selection Assistance Information, S-NSSAI.

7. The method of claim 1, wherein the instantiating at least one virtual bridge is performed in dependence of how many TSC and/or TSN domains that exist in the network.

8. The method of claim 1, wherein, each TSC and/or TSN domain comprises a CNC controller which manages at least one virtual bridge.

9. The method of claim 1, wherein at least one virtual bridge is part of a higher TSC and/or TSN domain, and wherein the method further comprises using a first CNC controller that is higher in a hierarchy to provide communication between at least two other CNC controllers that are lower in a hierarchy than the first CNC controller.

10. The method of claim 1, wherein at least one virtual bridge acts as a TSC and/or TSN domain.

11. The method of claim 10, wherein at least one of:
the TSC and/or TSN domain provides connectivity and/or transport services for at least one other TSC domain, and
the TSC and/or TSN domain provides connectivity and/or transport services between at least two local production domains.

12. A network node comprising:
processing circuitry configured to:
determine how many Time Sensitive Communication, TSC, and/or Time Sensitive Networking, TSN, domains exist in a network system comprising a plurality of TSC and/or TSN domains, wherein determining how may TSC and TSN domains exist in the network system comprises at least one of:
determining how many central network configuration, CNC, controllers that exist in the network; and
receiving information from a non-3GPP network controller; and
instantiate at least one virtual bridge, wherein each virtual bridge serves at least one TSC and/or TSN domain and wherein when instantiating at least one virtual bridge, the processing circuitry is configured to:
determine how many ports and user plane functions that are needed for a particular one of the plurality of TSC and/or TSN domains; and
instantiate a number of user plane function(s) in dependence of how many user plane function(s) are needed.

13. The network node of claim 12, wherein the network node is a core network node and the core network node comprises at least one of:
an Applications Function, AF,
an Operations & Maintenance, OAM, and
a network exposure Interface.

14. A method performed by a network node, the method comprising:
determining a group of ports in a network system;
dynamically modelling a first virtual bridge for the group of ports, wherein the group of ports are associated with a first Time Sensitive Communication, TSC, or a Time Sensitive Networking, TSN, domain, and wherein the first virtual bridge is associated with the first TSC or TSN domain and the first TSC or TSN domain is serving a user equipment, UE; and
when the UE moves to a second TSC or TSN domain, dynamically modelling a second virtual bridge associated with the second TSC or TSN domain.

15. The method of claim 14, wherein the first virtual bridge is managed by a central network configuration, CNC, controller, associated with the first TSC or TSN domain.

16. The method of claim 14, wherein the group of ports comprises an ingress port and/or an egress port.

17. The method of claim 14, wherein the group of ports comprises at least one UPF port and/or at least one user equipment, UE, port.

18. The method of claim 14, further comprising associating the group of ports with a bridge identifier.

19. The method of claim 14, wherein the network includes a plurality of virtual bridges and each virtual bridge is managed by a dedicated CNC controller from different TSC and/or TSN domains.

20. A network node comprising:
processing circuitry configured to:
determine a group of ports in a network system;
dynamically model a first virtual bridge for the group of ports, wherein the group of ports are associated with a first Time Sensitive Communication, TSC, or a Time Sensitive Networking, TSN, domain, and wherein the first virtual bridge is associated with the first TSC or TSN domain and the first TSC or TSN domain is serving a user equipment, UE; and
when the UE moves to a second TSC or TSN domain, dynamically modelling a second virtual bridge associated with the second TSC or TSN domain.

21. The network node of claim 20, wherein the first virtual bridge is managed by a central configuration controller, CNC, associated with the first TSC or TSN domain.

* * * * *